United States Patent
Oyaizu et al.

(10) Patent No.: US 12,513,420 B2
(45) Date of Patent: Dec. 30, 2025

(54) ADJUSTMENT DEVICE AND OPERATION METHOD OF ADJUSTMENT DEVICE

(71) Applicant: Sony Group Corporation, Tokyo (JP)

(72) Inventors: Hideki Oyaizu, Tokyo (JP); Ilya Reshetouski, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 50 days.

(21) Appl. No.: 18/712,261

(22) PCT Filed: Dec. 15, 2022

(86) PCT No.: PCT/JP2022/046133
§ 371 (c)(1),
(2) Date: May 22, 2024

(87) PCT Pub. No.: WO2023/127509
PCT Pub. Date: Jul. 6, 2023

(65) Prior Publication Data
US 2025/0016462 A1    Jan. 9, 2025

(30) Foreign Application Priority Data
Dec. 27, 2021  (JP) .................................. 2021-211926

(51) Int. Cl.
*H04N 23/955* (2023.01)
*G06T 7/80* (2017.01)
*G06T 7/90* (2017.01)

(52) U.S. Cl.
CPC ............. *H04N 23/955* (2023.01); *G06T 7/80* (2017.01); *G06T 7/90* (2017.01); *G06T 2207/10024* (2013.01)

(58) Field of Classification Search
CPC ...... H04N 23/955; H04N 23/56; H04N 23/67; H04N 23/55; H04N 23/60; G06T 7/80;
(Continued)

(56) References Cited

U.S. PATENT DOCUMENTS

| | | | | |
|---|---|---|---|---|
| 4,999,487 A | * | 3/1991 | Maruyama | G02B 5/1876 250/216 |
| 2008/0240535 A1 | * | 10/2008 | Frangioni | A61B 5/415 382/131 |

(Continued)

FOREIGN PATENT DOCUMENTS

| WO | WO 2019/176349 A1 | 9/2019 |
|---|---|---|
| WO | WO 2020/059181 A1 | 3/2020 |

OTHER PUBLICATIONS

Boominathan et al., Lensless Imaging: A Computational Renaissance, IEEE Signal Processing Magazine, Aug. 14, 2016, pp. 1-21, vol. 33, No. 5.

(Continued)

*Primary Examiner* — Chiawei Chen
(74) *Attorney, Agent, or Firm* — Paratus Law Group, PLLC

(57) ABSTRACT

There is provided an adjustment device and an operation method of the adjustment device that enable a positional relationship between a mask and an imaging element in a lensless camera to be adjusted with high accuracy and in a simple manner. When white light as incident light passes through a mask including a transmissive region including a plurality of condenser elements and a light-shielding region and provided at a preceding stage of an imaging element, the mask is adjusted to establish an appropriate positional relationship between the mask and the imaging element on the basis of a color of light corresponding to a wavelength of an image captured by the imaging element. The present disclosure is applicable to a calibration device for a mask and an imaging element in a lensless camera.

14 Claims, 16 Drawing Sheets

(58) Field of Classification Search
CPC . G06T 7/90; G06T 2207/10024; G02B 5/188; G02B 27/62
See application file for complete search history.

(56) References Cited

U.S. PATENT DOCUMENTS

| | | | |
|---|---|---|---|
| 2011/0228895 A1* | 9/2011 | Ridley | G06V 10/147 |
| | | | 378/2 |
| 2020/0084350 A1* | 3/2020 | Kishine | H04N 23/55 |
| 2020/0084376 A1* | 3/2020 | Naruse | H04N 23/55 |
| 2021/0144298 A1* | 5/2021 | Naruse | G02B 5/1876 |
| 2025/0189371 A1* | 6/2025 | Houck | G02B 5/201 |

OTHER PUBLICATIONS

Reshetouski et al., Lensless Imaging with Focusing Sparse URA Masks in Long-Wave Infrared and its Application for Human Detection, Computer Vision-ECCV 2020: 16th European Conference Proceedings, Aug. 23-28, 2020, pp. 1-17, Part XIX 16, Springer International Publishing, Glasgow, UK.

* cited by examiner

ADJUSTMENT DEVICE AND OPERATION METHOD OF ADJUSTMENT DEVICE

CROSS REFERENCE TO PRIOR APPLICATION

This application is a National Stage Patent Application of PCT International Patent Application No. PCT/JP2022/046133 (filed on Dec. 15, 2022) under 35 U.S.C. § 371, which claims priority to Japanese Patent Application No. 2021-211926 (filed on Dec. 27, 2021), which are all hereby incorporated by reference in their entirety.

TECHNICAL FIELD

The present disclosure relates to an adjustment device and an operation method of the adjustment device, and more particularly, to an adjustment device and an operation method of the adjustment device that enable adjusting a positional relationship between a mask and an imaging element in a lensless camera with high accuracy and in a simple manner.

BACKGROUND ART

A technique applied to a lensless camera in which a mask including a two-dimensional pattern including a transmissive region and a non-transmissive region is arranged at a preceding stage of an imaging element, and an original image being a scene is reconstructed on the basis of a modulated image including an observed value projected onto the imaging element through the mask is generally known.

In such a lensless camera, information regarding how radiation light from the scene is modulated through the mask and projected onto the imaging element is defined in advance as a matrix, and an actual scene is reconstructed from the matrix and the modulated image projected onto the imaging element (see Non-Patent Document 1).

The transmissive region constituting a part of the mask may be configured as a simple hole as opposed to the non-transmissive region impervious to light, or alternatively, may be configured as a condenser element such as a lens arranged in each hole.

In a case where the transmissive region is a simple hole, an increase in size of the transmissive region causes light formed as an image on a sensor to blur, resulting in a deterioration in image quality of the image to be reconstructed.

On the other hand, in a case of a configuration in which a condenser element such as a lens is arranged in a hole serving as the transmissive region, light is condensed to reduce blurring of the image formed on the sensor, so that a sharp image is formed, and it is therefore possible to increase the image quality of the image to be reconstructed.

There is also a case where a condenser element other than a lens is provided in such a transmissive region, and as an example, there is a method using a fresnel zone plate (FZP) (see Non-Patent Document 2).

The FZP is a condenser element having a shape in which transparent and opaque concentric circle zones are alternately arranged, the spacing between the zones is narrower toward the outer zone, and the FZP acts as an unequally spaced diffraction grating in which the more distant incident light is from the center, the greater the change in direction of the incident light, so that the incident light is concentrated at one point on an optical axis.

CITATION LIST

Non-Patent Document

Non-Patent Document 1: Boominathan, Vivek, et al. "Lensless Imaging: A computational renaissance." IEEE Signal Processing Magazine 33.5 (2016): 23-35.
Non-Patent Document 2: Reshetouski, Ilya, et al. "Lensless Imaging with Focusing Sparse URA Masks in Long-Wave Infrared and Its Application for Human Detection." Computer Vision-ECCV 2020: 16th European Conference, Glasgow, UK, Aug. 23-28, 2020, Proceedings, Part XIX 16. Springer International Publishing, 2020.

SUMMARY OF THE INVENTION

Problems to be Solved by the Invention

On the other hand, in the lensless camera, a positional relationship or a rotational relationship between the mask and the imaging element affects the image quality of the image to be reconstructed.

It is therefore necessary to perform a calibration to adjust the positional relationship between the imaging element and the mask with high accuracy.

In order to successfully perform the calibration to adjust the positional relationship between the imaging element and the mask, it is, however, necessary to adjust, for the mutual positional relationship, a total of six-axis adjustments including three-axis position adjustments and three-axis rotation adjustments such as yaw, pitch, and roll, and in order to adjust each position and rotation with high accuracy, it is necessary to repeat a fine adjustment, which takes time and effort.

The present disclosure has been made in view of such circumstances, and it is particularly an object of the present disclosure to enable a positional relationship between a mask and an imaging element in a lensless camera to be adjusted with high accuracy and in a simple manner.

Solutions to Problems

An adjustment device according to one aspect of the present disclosure is an adjustment device including: a mask holding portion configured to hold a mask of an imaging device and adjust a position and an angle of the mask relative to an imaging element, the mask including a transmissive region including a plurality of fresnel zone plates (FZPs) and a plurality of light-shielding regions and being configured to modulate incident light into modulated light by causing the incident light to pass through the mask, the imaging element being configured to capture a modulated image including the modulated light passing through the mask, the imaging device including the mask, the imaging element, and a reconstruction unit configured to reconstruct an image corresponding to the incident light on the basis of the modulated image; a point light source configured to emit white light as the incident light; and a control unit configured to control the mask holding portion to adjust the mask to establish a predetermined positional relationship between the mask and the imaging element on the basis of a color of light corresponding to a wavelength of an image captured by the imaging element when the white light passes through the mask as the incident light.

An operation method of an adjustment device according to one aspect of the present disclosure is an operation method of an adjustment device, the adjustment device including: a mask holding portion configured to hold a mask of an imaging device and adjust a position and an angle of the mask relative to an imaging element, the mask including a transmissive region including a plurality of fresnel zone plates (FZPs) and a plurality of light-shielding regions and being configured to modulate incident light into modulated light by causing the incident light to pass through the mask, the imaging element being configured to capture a modulated image including the modulated light passing through the mask, the imaging device including the mask, the imaging element, and a reconstruction unit configured to reconstruct an image corresponding to the incident light on the basis of the modulated image; and a point light source configured to emit white light as the incident light, the operation method including controlling the mask holding portion to adjust the mask to establish a predetermined positional relationship between the mask and the imaging element on the basis of a color of light corresponding to a wavelength of an image captured by the imaging element when the white light passes through the mask as the incident light.

According to one aspect of the present disclosure, a mask of an imaging device is held and a position and an angle of the mask relative to an imaging element are adjusted, the mask including a transmissive region including a plurality of fresnel zone plates (FZPs) and a plurality of light-shielding regions and being configured to modulate incident light into modulated light by causing the incident light to pass through the mask, the imaging element being configured to capture a modulated image including the modulated light passing through the mask, the imaging device including the mask, the imaging element, and a reconstruction unit configured to reconstruct an image corresponding to the incident light on the basis of the modulated image, when white light is emitted and passes through the mask as the incident light, the mask is adjusted to establish a predetermined positional relationship between the mask and the imaging element on the basis of a color of light corresponding to a wavelength of an image captured by the imaging element.

MODE FOR CARRYING OUT THE INVENTION

Figure 1:
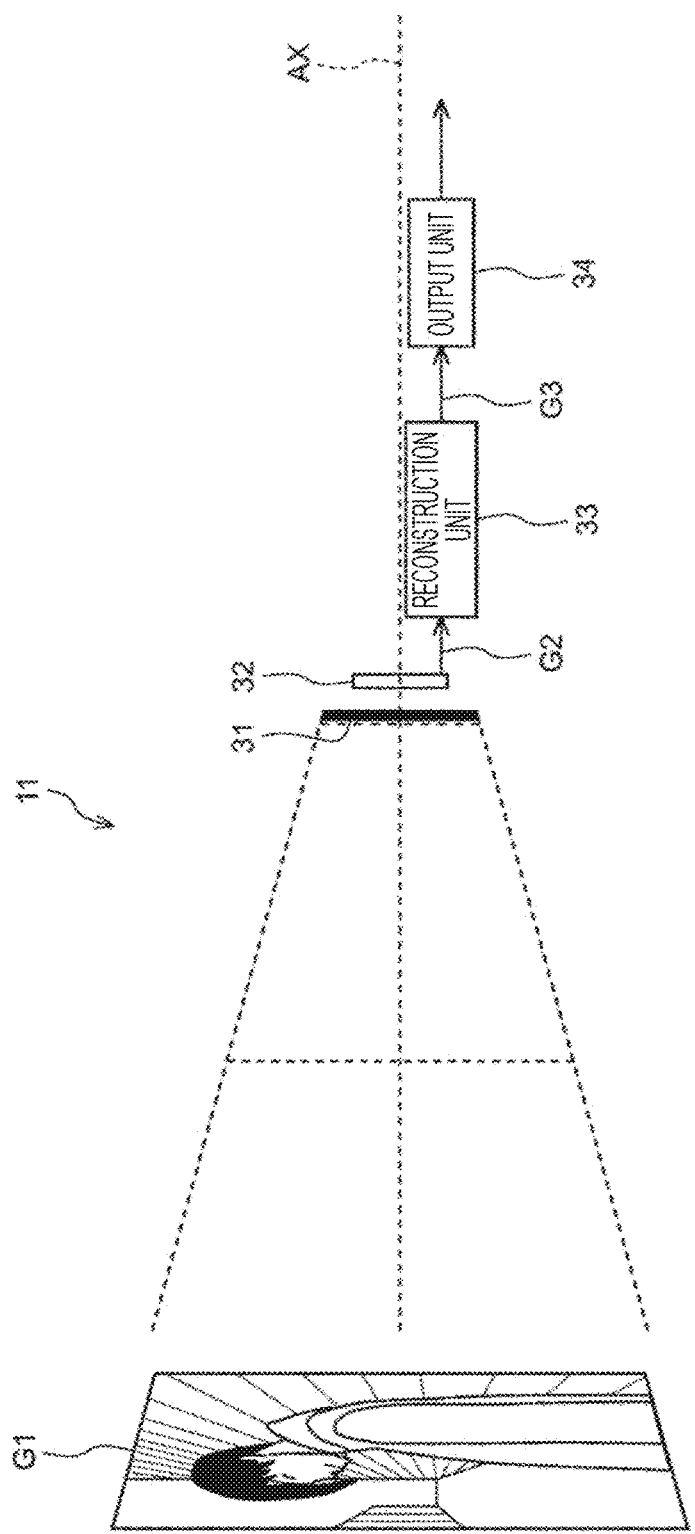
FIG. 1 is a diagram for describing an outline of a lensless camera.

Hereinafter, a preferred embodiment of the present disclosure will be described in detail with reference to the accompanying drawings. Note that, in the present specification and drawings, components having substantially the same functional configuration are denoted by the same reference numerals to avoid the description from being redundant.

Hereinafter, modes for carrying out the present technology will be described. The description will be given in the following order.

1. Outline of lensless camera
2. Outline of present disclosure
3. Configuration example of calibration device of present disclosure
4. Example of execution by software <<1. Outline of Lensless Camera>>

An outline of a lensless camera will be described with reference to FIG. 1. Note that FIG. 1 is a side cross-sectional view of an imaging device 11 functioning as a lensless camera.

The imaging device 11 in FIG. 1 is a so-called lensless camera, and includes a mask 31, an imaging element 32, a reconstruction unit 33, and an output unit 34.

Figure 2:
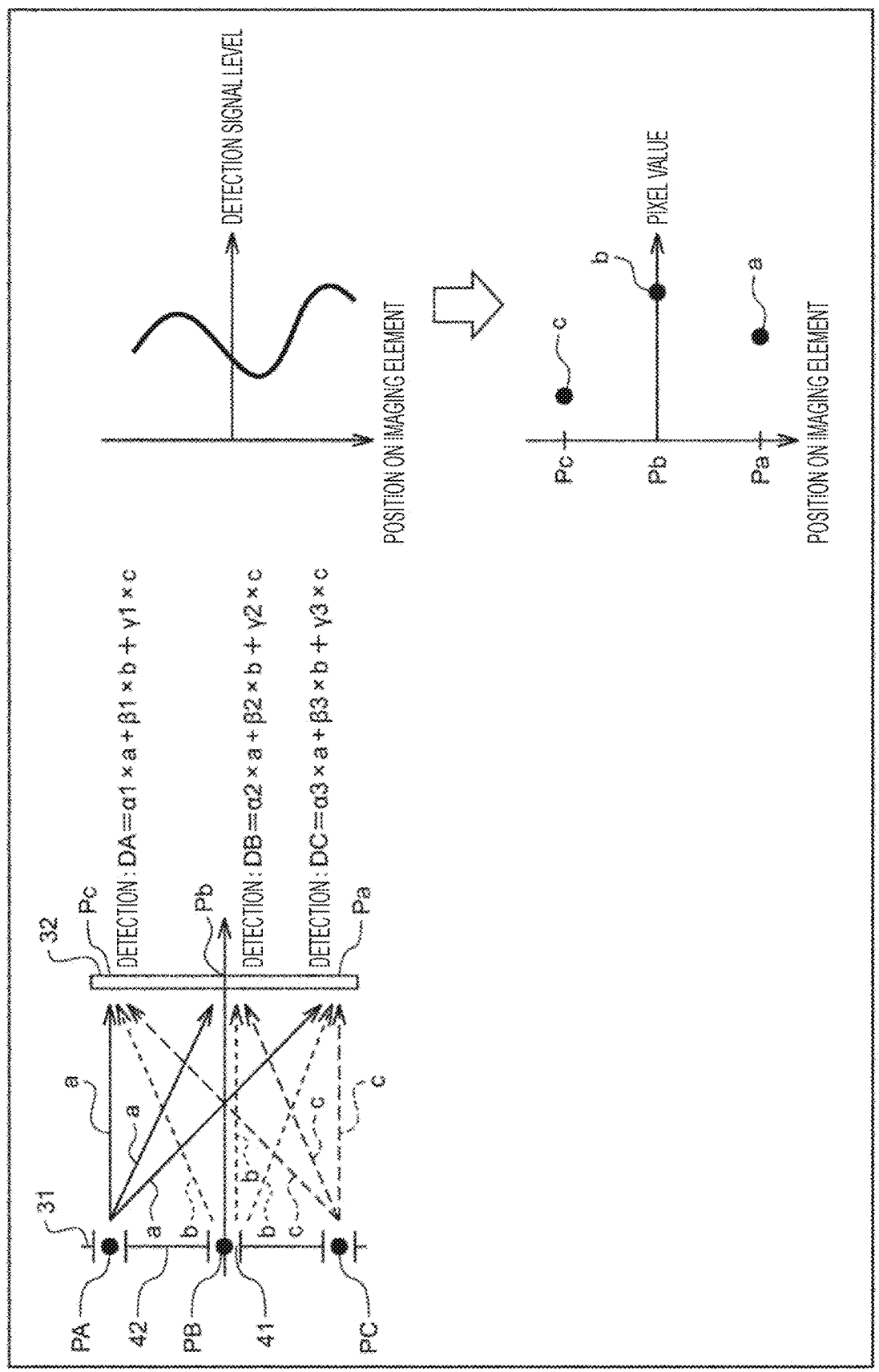
FIG. 2 is a diagram for describing an imaging principle of the lensless camera.

The mask 31 has a plate-shaped configuration containing a light-shielding material and provided at a preceding stage of the imaging element 32, and is formed with a transmissive region 41 including a hole-shaped opening portion that transmits incident light and a light-shielding region 42 impervious to light other than the transmissive region 41, for example, as illustrated in a left part of FIG. 2.

When the mask 31 receives light from a subject surface (in reality, a surface from which radiation light from a three-dimensional subject is emitted) G1 indicated by an optical axis AX as incident light, the mask 31 transmits the incident light via the transmissive region 41 to modulate and convert the incident light from the subject surface G1 as a whole into modulated light, and causes the imaging element 32 to receive and image the modulated light obtained by the conversion.

The imaging element 32 includes a complementary metal oxide semiconductor (CMOS) image sensor or a charge coupled device (CCD) image sensor, images the modulated light obtained by causing the mask 31 to modulate the incident light from the subject surface G1, and outputs the modulated light to the reconstruction unit 33 as a modulated signal G2.

Note that the mask 31 has a size that covers at least the entire surface of the imaging element 32, and basically, the imaging element 32 receives only the modulated light modulated by passing through the mask 31.

Furthermore, the transmissive region 41 formed in the mask 31 has a size larger than at least a pixel size of the imaging element 32. Furthermore, a gap having a minute distance d is provided between the imaging element 32 and the mask 31.

For example, as illustrated in an upper left part of FIG. 2, it is assumed that rays of incident light from point light sources PA, PB, and PC on the subject surface G1 pass through the transmissive region 41 of the mask 31 and are received as light beams of light intensities a, b, and c at positions Pa, Pb, and Pc on the imaging element 32, respectively.

As illustrated in the upper left part of FIG. 2, detection sensitivity of each pixel has directivity according to an incident angle, when the incident light is modulated by the transmissive region 41 that is set in the mask 31. Providing the detection sensitivity of each pixel with the incident angle directivity here means providing light receiving sensitivity characteristics according to the incident angle of the incident light so as to be different in accordance with the region on the imaging element 32.

That is, in a case where it is assumed that a light source constituting the subject surface G1 is a point light source, light beams having the same light intensity emitted from the same point light source impinge on the imaging element 32, but the light beams are modulated by the mask 31, so that the incident angle changes for each region on the imaging surface of the imaging element 32. Then, light receiving sensitivity characteristics, that is, the incident angle directivity is provided as the mask 31 changes the incident angle of the incident light in accordance with the region on the imaging element 32. Therefore, even light beams having the same light intensity are to be detected by the mask 31 provided at a preceding stage of the imaging surface of the imaging element 32 with different sensitivities in individual regions on the imaging element 32, and detection signals having different detection signal levels in each region are detected.

More specifically, as illustrated in an upper right part of FIG. 2, detection signal levels DA, DB, and DC of pixels at the positions Pa, Pb, and Pc on the imaging element 32 are expressed by the following Formulas (1) to (3), respectively. Note that, Formulas (1) to (3) in FIG. 2 have an inverted vertical relationship with the positions Pa, Pb, and Pc on the imaging element 32 in FIG. 2.

$$DR = \alpha 1 \times a + \beta 1 \times b + \gamma 1 \times c \quad (1)$$

$$DB = \alpha 2 \times a + \beta 2 \times b + \gamma 2 \times c \quad (2)$$

-continued
$$DC = \alpha 3 \times a + \beta 3 \times b + \gamma 3 \times c \quad (3)$$

Here, $\alpha 1$ is a coefficient for a detection signal level "a" set in accordance with an incident angle of a light beam from the point light source PA on the subject surface G1 to be restored at the position Pa on the imaging element 32.

Furthermore, $\beta 1$ is a coefficient for a detection signal level "b" set in accordance with an incident angle of a light beam from the point light source PB on the subject surface G1 to be restored at the position Pa on the imaging element 32.

Moreover, $\gamma 1$ is a coefficient for a detection signal level "c" set in accordance with an incident angle of a light beam from the point light source PC on the subject surface G1 to be restored at the position Pa on the imaging element 32.

Therefore, ($\alpha 1 \times a$) in the detection signal level DA indicates a detection signal level by a light beam at the position Pa from the point light source PA.

Furthermore, ($\beta 1 \times b$) in the detection signal level DA indicates a detection signal level by a light beam at the position Pa from the point light source PB.

Moreover, ($\gamma 1 \times c$) in the detection signal level DA indicates a detection signal level by a light beam at the position Pa from the point light source PC.

Therefore, the detection signal level DA is expressed as a composite value obtained by multiplying individual components of the point light sources PA, PB, and PC at the position Pa by the coefficients $\alpha 1$, $\beta 1$, and $\gamma 1$, respectively. Hereinafter, the coefficients $\alpha 1$, $\beta 1$, and $\gamma 1$ are collectively referred to as coefficient set.

Similarly, for the detection signal level DB at the position Pb, a coefficient set $\alpha 2$, $\beta 2$, and $\gamma 2$ individually corresponds to the coefficient set $\alpha 1$, $\beta 1$, and $\gamma 1$ for the detection signal level DA at the point light source PA. Furthermore, for the detection signal level DC at the position Pc, a coefficient set $\alpha 3$, $\beta 3$, and $\gamma 3$ individually corresponds to the coefficient set $\alpha 1$, $\beta 1$, and $\gamma 1$ for the detection signal level DA at the position Pa.

However, detection signal levels of pixels at the positions Pa, Pb, and Pc are values each expressed by a product-sum of the coefficients and the light intensities a, b, and c of light beams emitted from the point light sources PA, PB, and PC, respectively. Therefore, since the light intensities a, b, and c of the light beams emitted from the respective point light sources PA, PB, and PC are intermingled, these detection signal levels are different from those of an image in which an image of the subject is formed. Note that an image based on the detection signal levels DA, DB, and DC of the pixels at the positions Pa, Pb, and Pc corresponds to the modulated signal G2 in FIG. 1.

That is, by constructing simultaneous equations using the coefficient set $\alpha 1$, $\beta 1$, and $\gamma 1$, the coefficient set $\alpha 2$, $\beta 2$, and $\gamma 2$, the coefficient set $\alpha 3$, $\beta 3$, and $\gamma 3$, and the detection signal levels DA, DB, and DC, and solving for the light intensities a, b, and c, the respective pixel values at the positions Pa, Pb, and Pc are obtained as illustrated in a lower right part of FIG. 2. As a result, a restored image (final image) that is a set of pixel values is reconstructed and restored. Note that the image thus reconstructed corresponds to an image G3 in FIG. 1.

Furthermore, in a case where a distance between the imaging element 32 illustrated in the upper left part of FIG. 2 and the subject surface G1 changes, the coefficient set $\alpha 1$, $\beta 1$, and $\gamma 1$, the coefficient set $\alpha 2$, $\beta 2$, and $\gamma 2$, and the coefficient set $\alpha 3$, $\beta 3$, and $\gamma 3$ individually change; however, it is possible to reconstruct, by changing such a coefficient set, restored images (final images) of the subject surface at various distances.

It is therefore possible to reconstruct, by changing the coefficient set in accordance with various distances, images of the subject surface at various distances from an imaging position with one-time imaging.

As a result, in imaging using the lensless imaging device 11 in FIG. 1, it is not necessary to consider a phenomenon so-called out-of-focus, which occurs when imaging is performed by an imaging device using a lens in an out-of-focus state, and as long as imaging is performed such that a subject desired to be imaged falls within a visual field, it is possible to reconstruct images of a subject surface at various distances after the imaging by changing the coefficient set in accordance with the distances.

Figure 3:
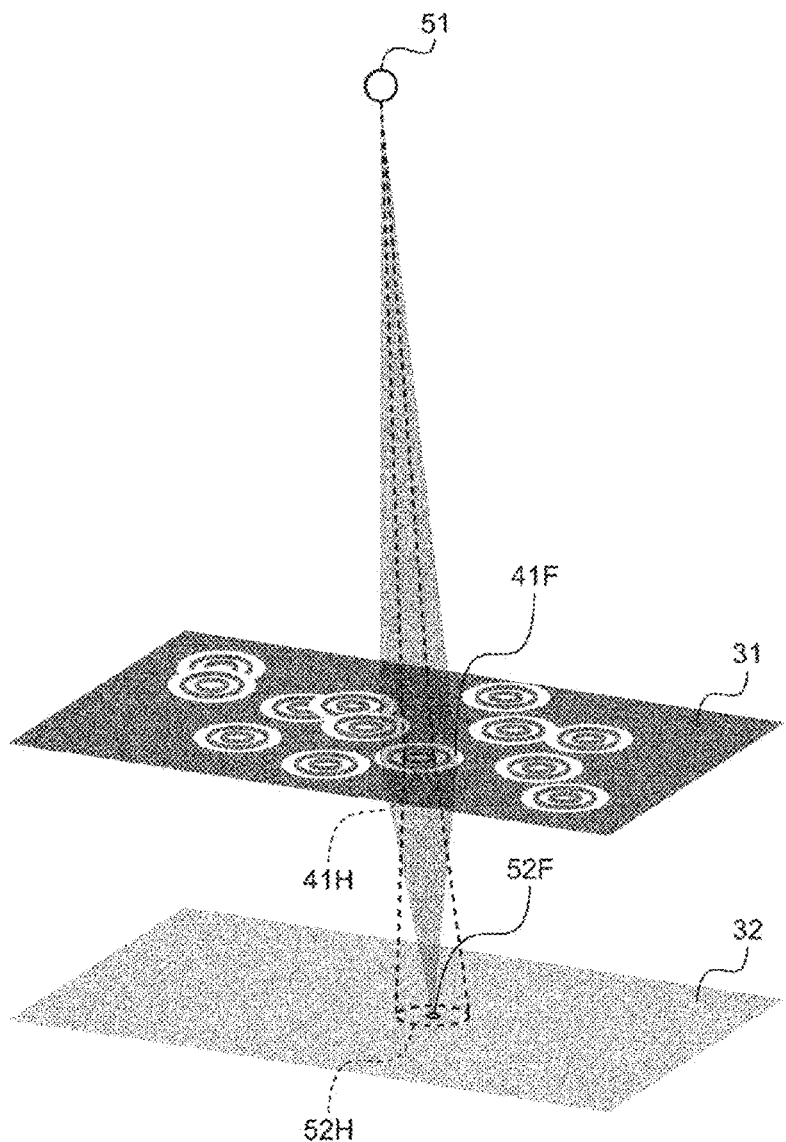
FIG. 3 is a diagram illustrating an example in a case where a condenser element is provided in a transmissive region.

Note that, since the detection signal level illustrated in the upper right part of FIG. 2 is not a detection signal level corresponding to an image in which the image of the subject is formed, the detection signal level is not a pixel value but merely an observed value and corresponds to the modulated signal G2 including the observed value. Furthermore, since the detection signal level illustrated in the lower right part of FIG. 3 is a value of each pixel of the restored image (final image) restored on the basis of a signal value for each pixel corresponding to the image in which the image of the subject is formed, that is, the modulated signal G2, the detection signal level is a pixel value. That is, the restored image (final image) of the subject surface G1 corresponds to the image G3.

Such a configuration allows the imaging device 11 to function as a so-called lensless camera. As a result, since an imaging lens is not an essential component, it is possible to make the imaging device thinner in profile, that is, to reduce a thickness of the imaging device in the incident direction of light in the configuration that implements the imaging function. Furthermore, by variously changing the coefficient set, it is possible to restore and reconstruct the final image (restored image) on the subject surface at various distances.

Note that, hereinafter, an image corresponding to the modulated signal G2 captured by the imaging element 32 but before being reconstructed is simply referred to as modulated image, and an image corresponding to the image G3 reconstructed and restored by subjecting the modulated image to signal processing is referred to as final image (restored image). Therefore, from one modulated image, images on the subject surface G1 at various distances can be reconstructed as the final image by variously changing the coefficient set described above.

The reconstruction unit 33 has the above-described coefficient set, and reconstructs the final image (restored image) (image G3 in FIG. 1) on the basis of the modulated image (modulated signal G2 in FIG. 1) captured by the imaging element 32 using a coefficient set corresponding to the distance from the imaging position of the imaging device 11 to the subject surface G1, and outputs the final image to the output unit 34.

The output unit 34 performs signal processing on the final image supplied from the reconstruction unit 33 and outputs the resultant image as an image signal.

<Configuration of Transmissive Region>

The transmissive region 41 constituting a part of the mask 31 may be configured as an opening portion such as a simple small-diameter pinhole as opposed to the light-shielding region 42 impervious to light, or alternatively, may be configured as a condenser element such as a lens arranged in each transmissive region 41.

For example, as illustrated in FIG. 3, in a case where the transmissive region 41 is a simple opening portion that is a small-diameter pinhole 41H, light from a light source 51 that impinges on the imaging element 32 is diffused and blurred due to diffraction, and the image quality of the image to be reconstructed deteriorates accordingly.

On the other hand, as illustrated in FIG. 3, in a case of a configuration where a condenser element 41F such as a lens is arranged in the transmissive region 41, the light from the light source 51 is condensed to reduce blurring of the image formed on the imaging element 32, and the image is formed as a sharp image accordingly, so that the image quality of the image to be reconstructed can be improved.

Note that, in FIG. 3, an image forming region on the imaging element 32 when the transmissive region 41 is the small-diameter pinhole 41H including a simple opening portion is represented by a circled image 52H drawn by a dotted line, and an image forming region on the imaging element 32 in a case where the transmissive region 41 is configured as the condenser element 41F is represented by an image 52F indicated by a white circle.

That is, in a case where the transmissive region 41 is the small-diameter pinhole 41H including a simple opening portion, the image 52H represents that the incident light from the light source 51 is diffused due to diffraction and impinges on the imaging element 32 in a blurred state.

On the other hand, the image 52F represents that light is condensed by the condenser element 41F to impinge on the imaging element 32 as a small spot-shaped region.

The condenser element 41F other than a lens may be provided in the transmissive region 41, and for example, a fresnel zone plate (FZP) may be used.

The FZP is a condenser element having a shape in which transparent and opaque concentric circle zones are alternately arranged, the spacing between the zones is narrower toward the outer zone, and the FZP acts as an unequally spaced diffraction grating in which the more distant incident light is from the center, the greater the change in direction of the incident light, so that the incident light is concentrated at one point on an optical axis.

Note that FIG. 3 illustrates an example of a case where the condenser element 41F includes the FZP.

<Relationship Between Mask and Imaging Element>

Figure 4:
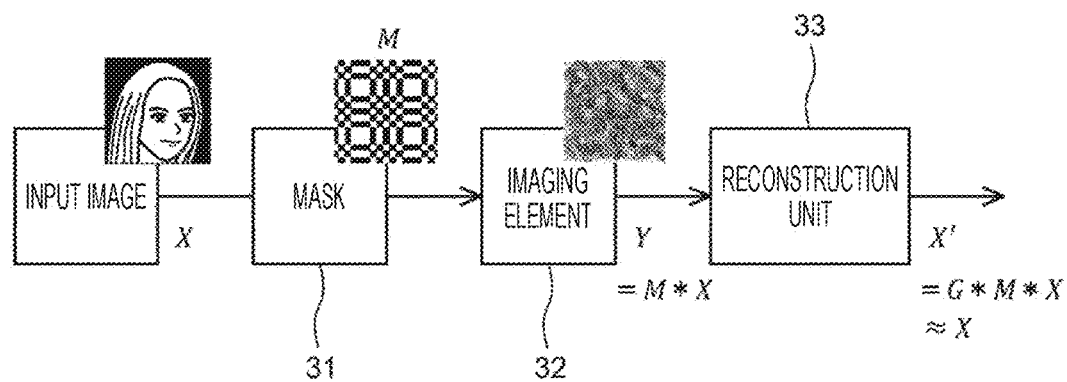
FIG. 4 is a diagram for describing imaging processing performed by the lensless camera.

A series of processing performed by the imaging device 11 on the basis of the above-described principle is summarized as processing illustrated in FIG. 4.

That is, when incident light including an input image X corresponding to the subject surface G1 in FIG. 1 impinges on the mask 31, the incident light is modulated by a pattern M of the mask 31 and is then imaged by the imaging element 32.

The imaging element 32 captures, as a modulated image Y corresponding to the modulated signal G2 in FIG. 1, an image of the incident light obtained by modulating the input image X corresponding to the subject surface G1 with the pattern M of the mask 31, and outputs the modulated image Y to the reconstruction unit 33.

The reconstruction unit 33 reconstructs, by performing signal processing on the modulated image Y, a final image X' corresponding to the input image X, the final image X' corresponding to the final image G3 in FIG. 1.

It is known that, in the series of processing performed by the imaging device 11, the modulated image Y corresponding to the modulated signal G2 imaged by the imaging element 32 can be expressed as a convolution of the pattern M of the mask 31 and the input image X as expressed by the following Formula (4).

$$Y = M * X \quad (4)$$

Here, as illustrated in FIG. 4, Y is a vector of a length P representing a modulated image captured by the imaging element 32, that is, a value observed by the imaging element 32, M is a matrix representing a pattern of the mask 31, X is a vector of a length N representing an input image, and * represents a convolution operation.

As the pattern of the mask 31 expressed as the matrix M, for example, a uniformly redundant arrays (URA) pattern or a modified URA (MURA) pattern is generally used.

From the relationship of Formula (4) described above, the processing of reconstructing the image X' corresponding to the reconstructed image G3 can be obtained by, for example, calculation as in the following Formula (5).

$$X' = G * M * X \quad (5)$$

Here, X' represents a reconstructed image corresponding to the reconstructed image G3 in FIG. 1, and G represents a restoration matrix (inverse matrix of M) corresponding to the matrix of the pattern M of the mask 31. Each element of the restoration matrix G corresponds to the coefficient set described above.

Furthermore, in the reconstruction of the reconstructed image X', a Tikhonov regularization method or the like is generally used.

By the way, in order to modulate the image X of the subject surface G1 with the mask 31 including the matrix M and reconstruct the image X from the modulated image including the observed value on the imaging element 32, the matrix M of the mask 31 needs to correctly represent physical properties.

The physical properties include not only the pattern of the mask 31 but also a geometric relationship between the mask 31 and the imaging element 32, so that in a case where the relationship is different from the design, the image cannot be correctly reconstructed.

Ideally, the matrix M of the mask 31 can be obtained from design data, but in practice, an error occurs due to variations in assembly precision.

Therefore, calibration for correcting six-axis geometric errors in the mutual positions X, Y, and Z between the mask 31 and the imaging element 32 and rotation yaw (y), pitch (p), and roll (r) is required. Note that, hereinafter, Y indicating a position is written in uppercase, and y indicating yaw is written in lowercase, so that both are distinguished from each other.

The calibration given herein is processing of observing the light of the point light source on the imaging element 32 and adjusting the position or angle of the mask 31 to the position calculated by means of simulation.

In order to correct parameters of the six axes, it is, however, necessary to accurately obtain the position of each point and adjust each parameter little by little so that each point becomes a correct position, and it takes time to correct the parameters.

Therefore, the present disclosure is intended to enable the positional relationship between the mask 31 and the imaging element 32 to be adjusted with high accuracy and in a simple manner.

<<2. Outline of Present Disclosure>>
<Principle of how to Detect Difference in Distance Between Mask and Imaging Element>

Next, an outline of the present disclosure will be described.

In a case where the condenser element 41F including, for example, the FZP is provided in the transmissive region 41 of the mask 31, when the positional relationship between the mask 31 and the imaging element 32 is appropriate, the incident light from the point light source passes through the condenser element 41F to form an image on the imaging element 32.

However, in a case where the point light source is white light, the incident light contains light having different wavelengths, so that a focusing distance varies in a manner that depends on the wavelengths.

Figure 5:
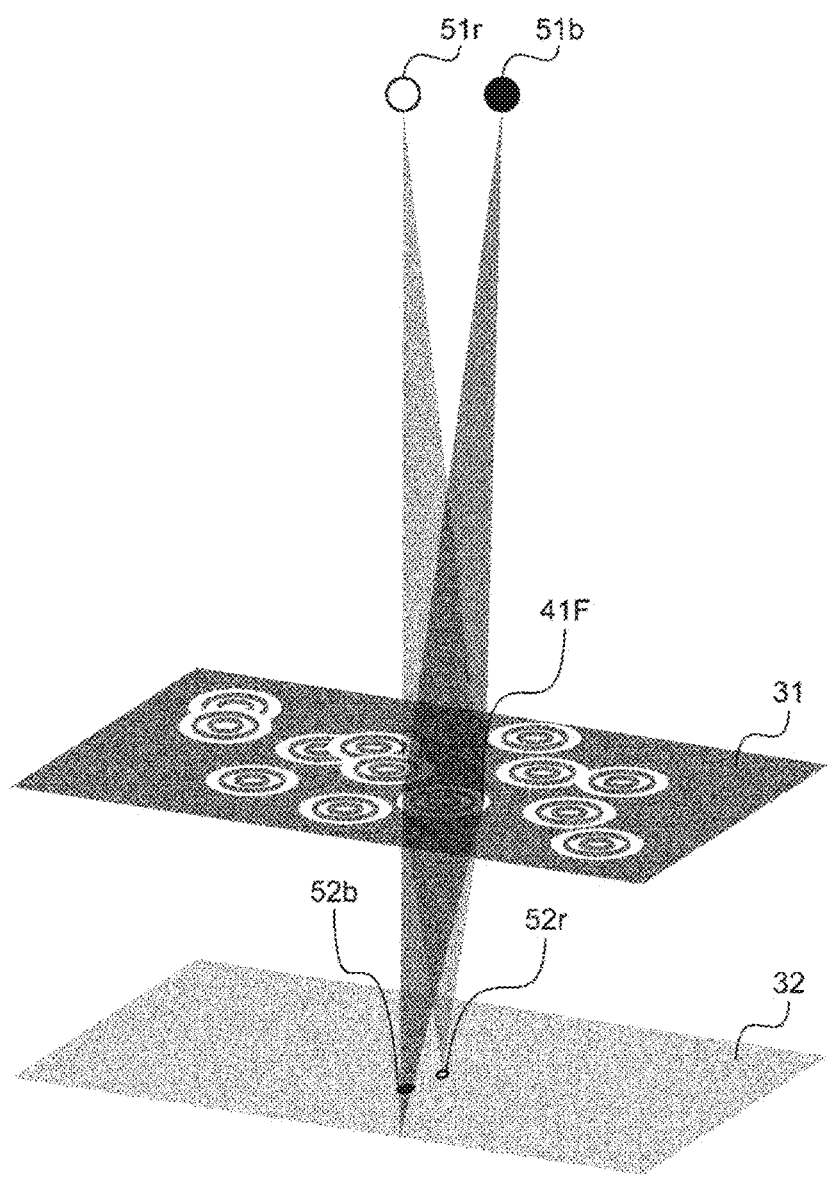
FIG. 5 is a diagram illustrating a principle of how to detect a difference in distance between a mask and an imaging element.

Here, for example, consider a case where, as illustrated in FIG. 5, a light source 51r of an R wavelength that becomes red light and a light source 51b of a B wavelength that becomes blue light are present at equal distances from the mask 31.

In a case of FIG. 5, when incident light from each of the light sources passes through the condenser element 41F including the FZP, and an image 52r of the R wavelength that becomes red light is appropriately focused on the imaging element 32, an image 52b of the B wavelength that becomes blue light has a focal position farther than the imaging element 32, and thus becomes larger in diameter than the image 52r.

Note that, in FIG. 5, the light sources 51r and 51b and the images 52r and 52b are drawn at different positions for the sake of description, but it is assumed that they are coaxial, so that the light sources 51r and 51b are at the same position, and the images 52r and 52b have the same center position but different spot diameters.

Furthermore, in FIG. 5, the light source 51r of the R wavelength that becomes red light is represented by a white circle, and the light source 51b of the B wavelength that becomes blue light is represented by a black circle, and the same applies hereinafter.

Figure 6:
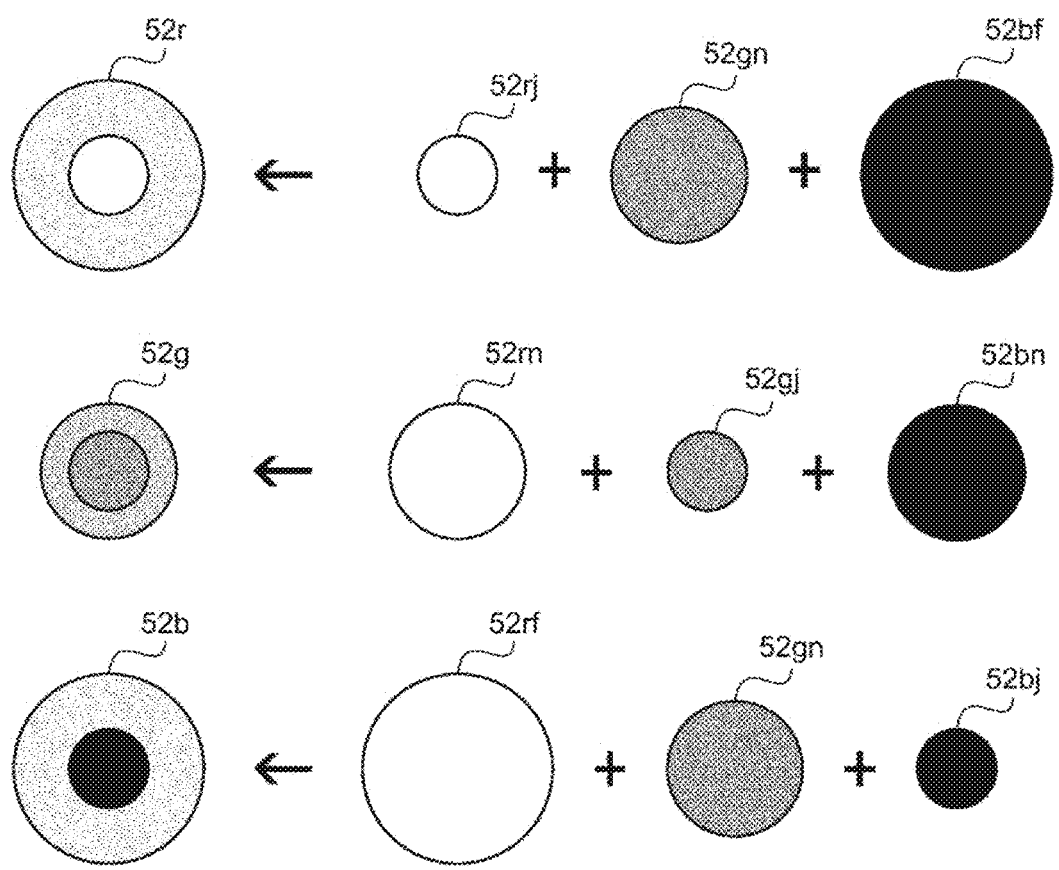
FIG. 6 is a diagram illustrating a difference between images generated in accordance with the distance between the mask and the imaging element.

In a case where the distance between the mask 31 and the imaging element 32 is set to be, for example, a distance at which light of a G wavelength that becomes green light comes into a focus, an image on the imaging element 32 becomes an image 52g as illustrated in FIG. 6.

That is, in the image 52g in FIG. 6, when an image 52gj of the G wavelength that becomes green light is focused to have the minimum spot diameter and thereby emits the strongest light, an image 52rn of the R wavelength that becomes red light and an image 52bn of the B wavelength that becomes blue light are not focused to have larger spot diameters.

Therefore, on the imaging element 32, the image 52rn, the image 52gj, and the image 52bn overlap each other, thereby causing the image 52g that emits the strongest green light to be detected.

Note that, in FIG. 6, the image 52gj that emits light of the G wavelength that becomes green light is represented by a gray circle, and the same applies hereinafter.

Furthermore, in a case where the distance between the mask 31 and the imaging element 32 is set to be, for example, a distance at which light of the R wavelength that becomes red light comes into a focus, an image on the imaging element 32 becomes an image 52r as illustrated in FIG. 6.

That is, in the image 52r in FIG. 6, when an image 52rj of the R wavelength that becomes red light is focused to have the minimum spot diameter and thereby emits the strongest light, an image 52gn of the G wavelength that becomes green light is not focused to have a larger spot diameter, and moreover, an image 52bf of the B wavelength that becomes blue light is further deviated in focal position than the G wavelength and thus becomes larger in spot diameter than the image gn of the G wavelength.

Therefore, on the imaging element 32, the image 52rj, the image 52gn, and the image 52bf overlap each other, thereby causing the image 52r that emits the strongest red light to be detected.

Moreover, in a case where the distance between the mask 31 and the imaging element 32 is set to be, for example, a distance at which light of the B wavelength that becomes blue light comes into a focus, an image on the imaging element 32 becomes an image 52b as illustrated in FIG. 6.

That is, in the image 52b in FIG. 6, when an image 52bj of the B wavelength that becomes blue light is focused to have the minimum spot diameter and thereby emits the strongest light, the image 52gn of the G wavelength that becomes green light is not focused to have a larger spot diameter, and moreover, an image 52rf of the R wavelength that becomes red light is further deviated in focal position than the G wavelength and thus becomes larger in spot diameter than the image gn of the G wavelength.

Therefore, on the imaging element 32, the image 52rf, the image 52gn, and the image 52bj overlap each other, thereby causing the image 52b that emits the strongest blue light to be detected.

<Principle of how to Adjust Difference in Distance>

The above-described relationship shows that the color of the image 52 detected on the imaging element 32 differs in a manner that depends on the distance between the mask 31 and the imaging element 32, so that it is possible to detect a difference by observing the color of this image, and it is therefore possible to adjust the distance between the mask 31 and the imaging element 32 by adjusting the difference in color.

Figure 7:
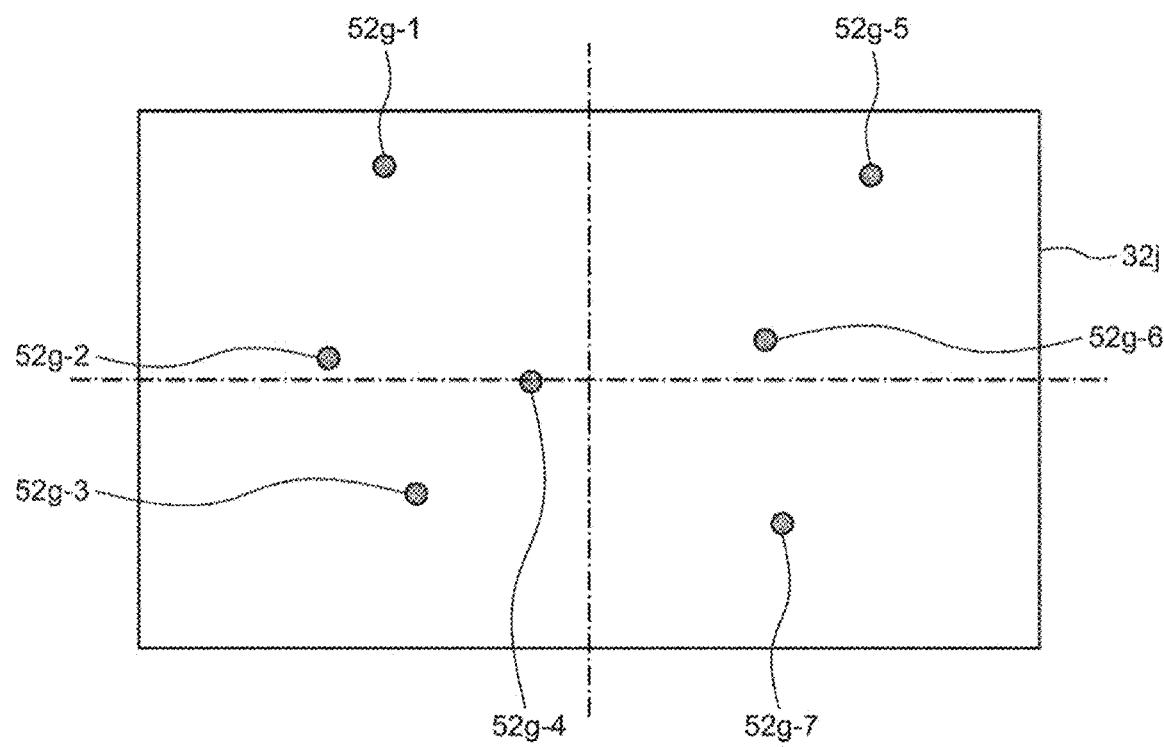
FIG. 7 is a diagram illustrating an example of an image when the distance between the mask and the imaging element is equal to an appropriate distance.

For example, in a case where the distance between the mask 31 and the imaging element 32 is appropriately set, as illustrated with an imaging element 32j in FIG. 7, images 52g-1 to 52g-7 of green light are detected.

That is, in this case, the distance between the mask 31 and the imaging element 32 is appropriate, and no additional adjustment is required.

Figure 8:
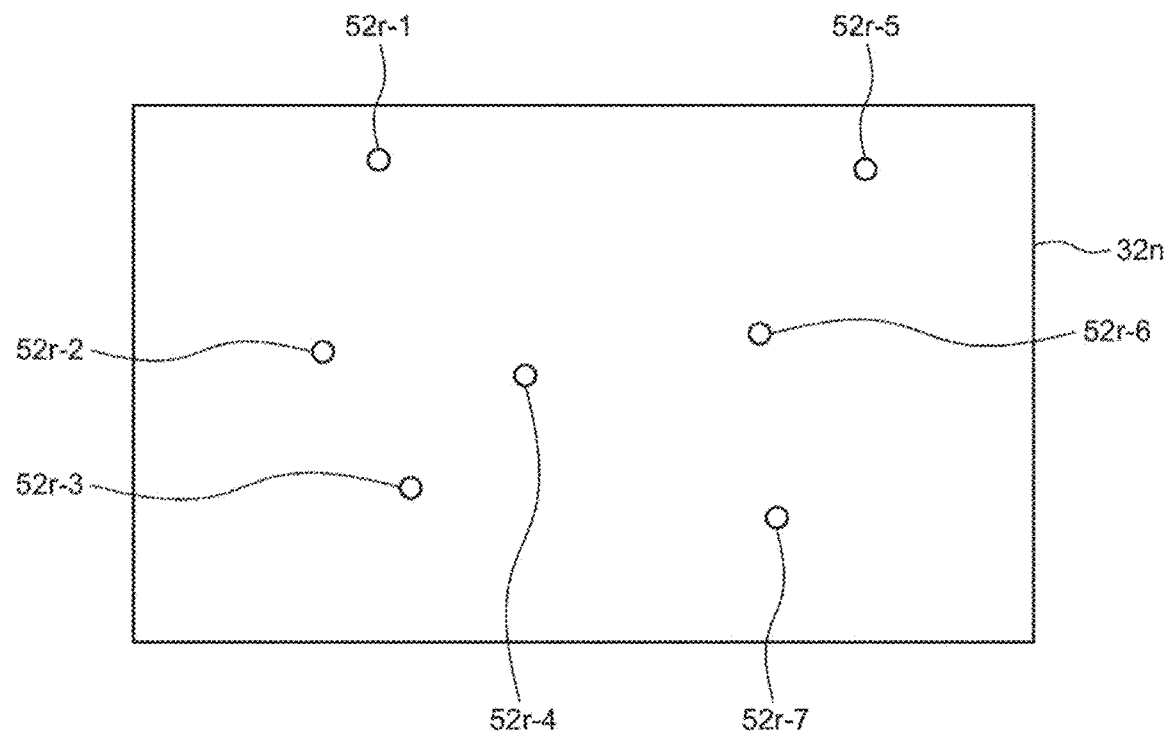
FIG. 8 is a diagram illustrating an example of an image when the distance between the mask and the imaging element is shorter than the appropriate distance.

On the other hand, for example, in a case where the distance between the mask 31 and the imaging element 32 is deviated so as to be shorter than the appropriate distance, as illustrated with an imaging element 32n in FIG. 8, images 52r-1 to 52r-7 are detected.

That is, in this case, since the distance between the mask 31 and the imaging element 32 is shorter than the appropriate distance, it is necessary to pay attention to the color of the observed image and increase the distance between the mask 31 and the imaging element 32 such that all the images 52r-1 to 52r-7 change to the images 52g-1 to 52g-7 of green light as illustrated in FIG. 7.

Figure 9:
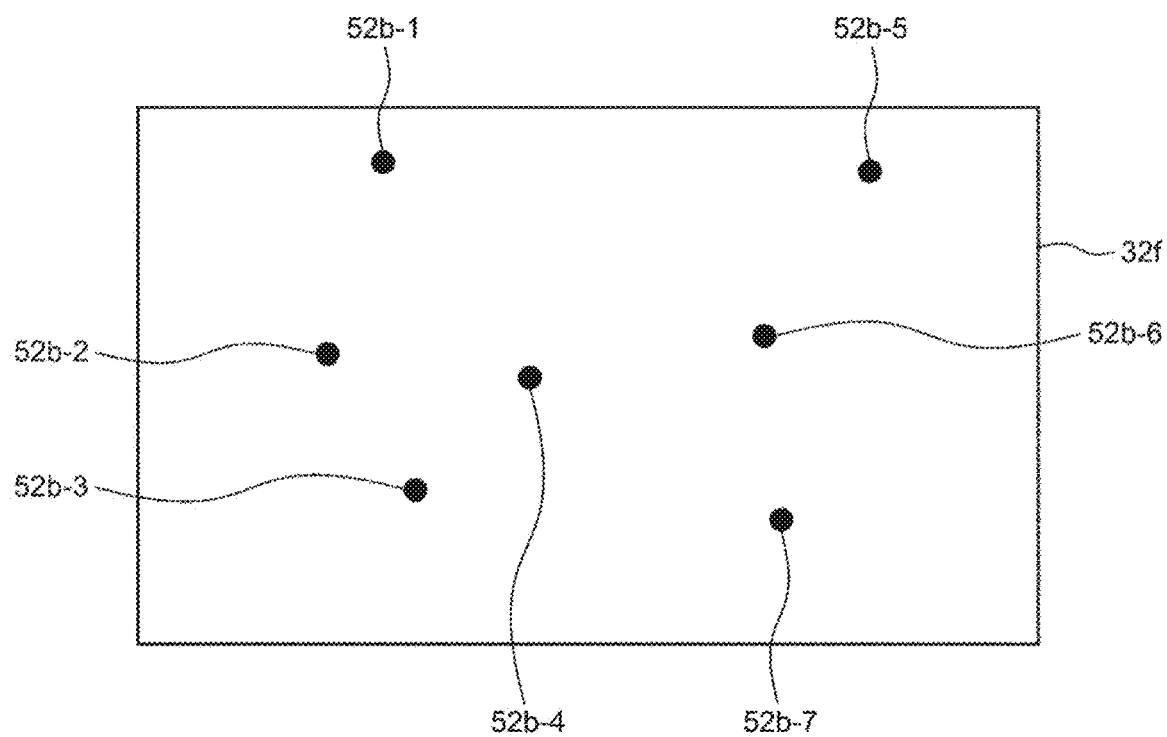
FIG. 9 is a diagram illustrating an example of an image when the distance between the mask and the imaging element is longer than the appropriate distance.

Furthermore, for example, in a case where the distance between the mask 31 and the imaging element 32 is deviated so as to be longer than the appropriate distance, as illustrated with an imaging element 32f in FIG. 9, images 52b-1 to 52b-7 are detected.

That is, in this case, since the distance between the mask 31 and the imaging element 32 is longer than the appropriate distance, it is necessary to pay attention to the color of the observed image and reduce the distance between the mask 31 and the imaging element 32 such that all the images 52b-1 to 52b-7 change to the images 52g-1 to 52g-7 of green light as illustrated in FIG. 7.

<Principle of how to Detect and Adjust Difference in Rotation Between Mask and Imaging Element>

<Pitch Rotation>

The principle of how to detect and adjust a difference in distance between the mask 31 and the imaging element 32 has been described above, and a principle of how to detect and adjust a difference in rotation between the mask 31 and the imaging element 32 will be described next.

Figure 10:
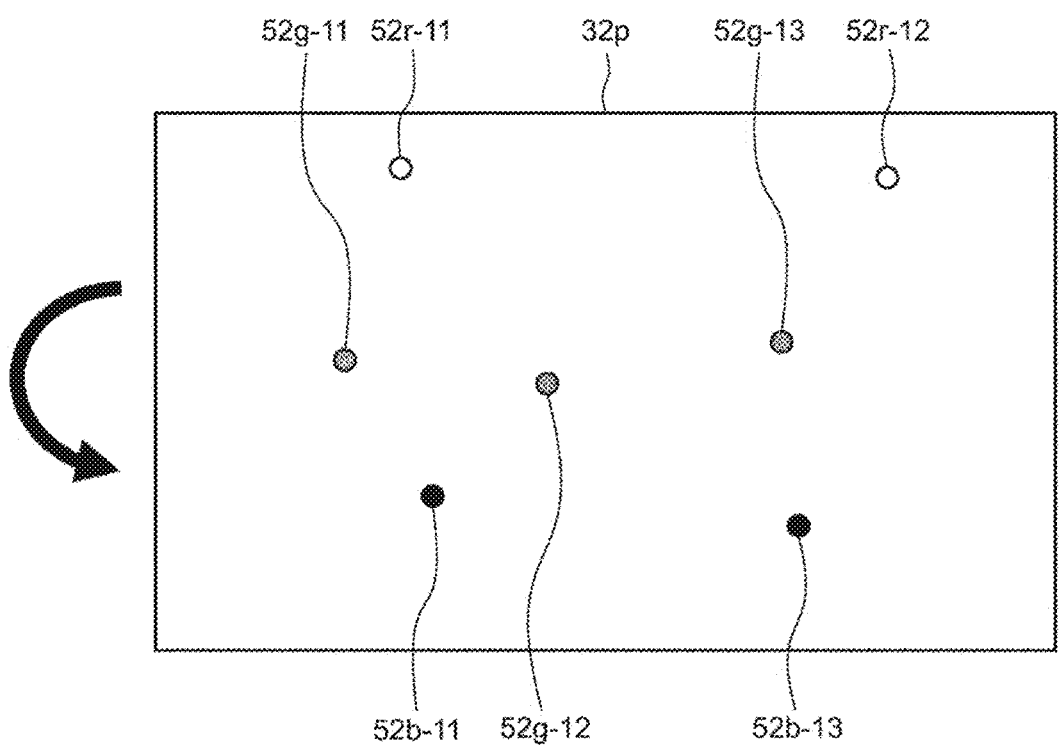
FIG. 10 is a diagram illustrating an example of an image when there is a difference in pitch rotation between the mask and the imaging element.

For example, in a case where the imaging element 32 is misaligned due to pitch rotation relative to the mask 31, for example, images 52r-11 and 52r-12, images 52g-11 to 52g-13, and images 52b-11 and 52b-12 as illustrated with an imaging element 32p in FIG. 10 are detected.

That is, in FIG. 10, the images 52r-11 and 52r-12 are detected as red light, the images 52g-11 to 52g-13 are detected as green light, and the images 52b-11 and 52b-12 are detected as blue light.

It is therefore recognized that a range on the imaging element 32p corresponding to the upper part of FIG. 10 where the images 52r-11 and 52r-12 are detected is in a state where the distance to the mask 31 is shorter.

Furthermore, it is recognized that a range on the imaging element 32p corresponding to the middle part of FIG. 10 where the images 52g-11 to 52g-13 are detected is in a state where the distance to the mask 31 is appropriate.

Moreover, it is recognized that a range on the imaging element 32p corresponding to the lower part of FIG. 10 where the images 52g-11 to 52g-13 are detected is in a state where the distance to the mask 31 is longer.

That is, it is recognized that the imaging element 32p has rotated in the pitch direction to come into a state where the range corresponding to the upper part of FIG. 10 where the images 52r-11 and 52r-12 are detected is inclined toward the front side of the paper surface of FIG. 10 around the range corresponding to the middle part of FIG. 10 where the images 52g-11 to 52g-13 are detected, and a state where the range corresponding to the lower part of FIG. 10 where the images 52b-11 and 52b-12 are detected is inclined toward the back side of the paper surface of FIG. 10 around the range corresponding to the middle part of FIG. 10 where the images 52g-11 to 52g-13 are detected.

Therefore, in a case where the observation result as illustrated with the imaging element 32p in FIG. 10 is obtained, with attention paid to the colors of light observed in the images 52r-11 and 52r-12 and the images 52b-11 and 52b-12, the adjustment is performed by rotating the range on the imaging element 32 corresponding to the upper part of FIG. 10 toward the back side of the paper surface of FIG. 10 around the range corresponding to the middle part of FIG. 10 where the images 52g-11 to 52g-13 are detected, and rotating the range corresponding to the lower part of FIG. 10 toward the front side of the paper surface of FIG. 10 around the range corresponding to the middle part of FIG. 10 to cause all of the images 52r-11 and 52r-12 and the images 52b-11 and 52b-12 to be observed as green light.

<Yaw Rotation>

Figure 11:
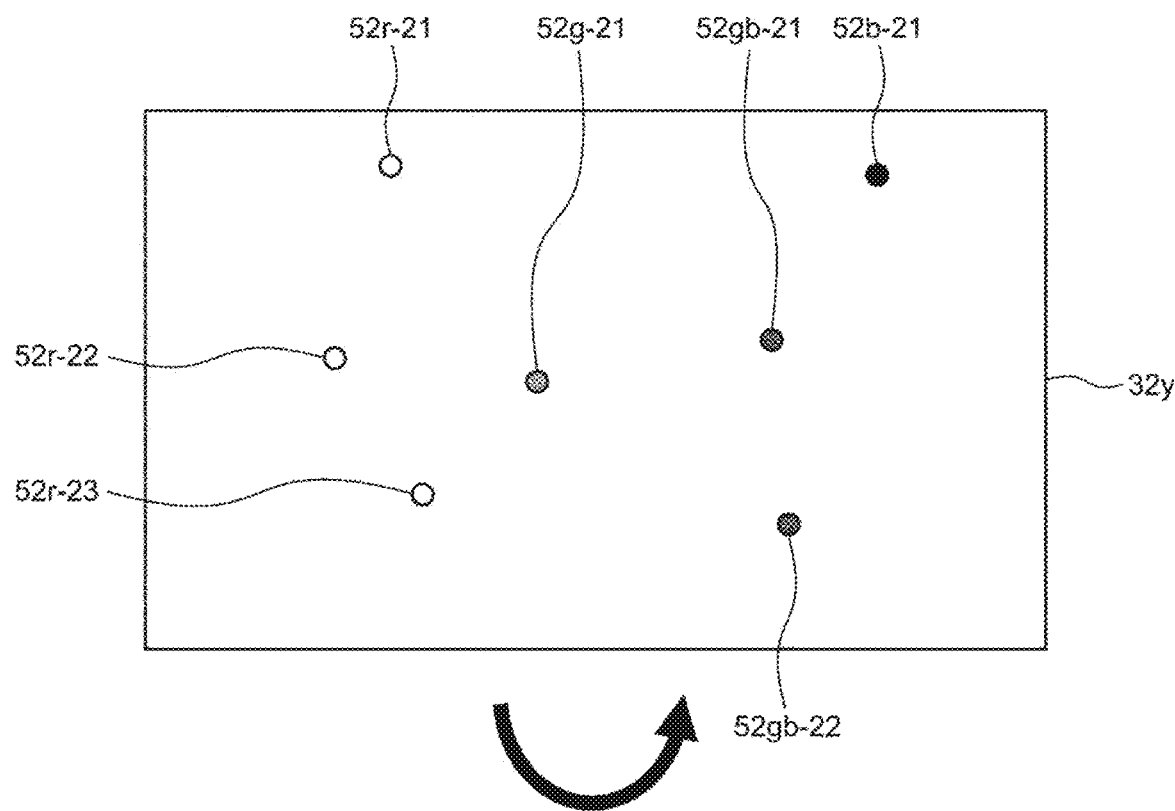
FIG. 11 is a diagram for describing an example of an image when there is a difference in yaw rotation between the mask and the imaging element.

For example, in a case where the imaging element 32 is misaligned due to yaw rotation relative to the mask 31, for example, images 52r-21 to 52r-23, an image 52g-21, images 52bg-21 and 52bg-22, and an image 52b-21 as illustrated with an imaging element 32y in FIG. 11 are detected.

That is, in FIG. 11, the images 52r-21 to 52r-23 are detected as red light, the image 52g-21 is detected as green light, the images 52gb-21 and 52gb-22 are detected as light blue light, and the image 52*b*-21 is detected as blue light. Note that, the light blue of the images 52*gb*-21 and 52*gb*-22 is represented by a gray circle that is an intermediate color between the image 52*g* and the image 52*b*.

It is therefore recognized that a range on the imaging element 32 where the images 52*r*-21 to 52*r*-23 illustrated in the left part of FIG. 11 are detected is in a state where the distance to the mask 31 is shorter.

Furthermore, it is recognized that a range on the imaging element 32 where the image 52*g*-21 illustrated at the center of FIG. 11 is detected is in a state where the distance to the mask 31 is appropriate.

Moreover, it is recognized that a range on the imaging element 32 where the image 52*b*-21 illustrated in the right part of FIG. 11 is detected is in a state where the distance to the mask 31 is longer.

Furthermore, it is recognized that a range on the imaging element 32 where the images 52*gb*-21 and 52*gb*-22 in FIG. 11 are detected is in a state where the distance to the mask 31 is closer to the appropriate distance than the image 52*b*-21, but is longer.

That is, it is recognized that the imaging element 32 has rotated in the yaw direction to come into a state where the range where the images 52*r*-21 to 52*r*-23 illustrated in the left part of FIG. 11 are detected is inclined toward the front side of the paper surface of FIG. 11 around the range where the image 52*g*-21 illustrated at the center of FIG. 11 is detected, and a state where the range where the image 52*b*-21 illustrated in the right part of FIG. 11 is detected is inclined toward the back side of the paper surface of FIG. 11 around the range where the image 52*g*-21 illustrated at the center of FIG. 11 is detected.

Therefore, in a case where the observation result as illustrated with the imaging element 32*y* in FIG. 11 is obtained, with attention paid to the colors of light observed in the images 52*r*-21 to 52*r*-23 and the images 52*gb*-21, 52*gb*-22, and 52*b*-21, the adjustment is performed by rotating the range on the imaging element 32 corresponding to the left part of FIG. 11 toward the back side of the paper surface of FIG. 11 around the range corresponding to the center of FIG. 11 where the image 52*g*-21 is detected, and rotating the range corresponding to the right part of FIG. 11 toward the front side of the paper surface of FIG. 11 around the range corresponding to the center of FIG. 11 to cause all of the images 52*r*-21 to 52*r*-23 and the images 52*gb*-11, 52*gb*-12, and 52*b*-21 to be observed as green light.

In the present disclosure, the adjustment is performed with high accuracy and in a simple manner on the basis of the above-described principle by adjusting the positional relationship between the mask 31 and the imaging element 32 in accordance with the color of the image 52 observed on the imaging element 32 with the condenser element 41F provided in the opening portion of the mask 31, so as to cause the mask 31 and the imaging element 32 to have a positional relationship appropriate for imaging.

<<3. Configuration Example of Calibration Device of Present Disclosure>>

Next, a configuration example of a lensless camera calibration device of the present disclosure will be described with reference to FIG. 12.

Figure 12:
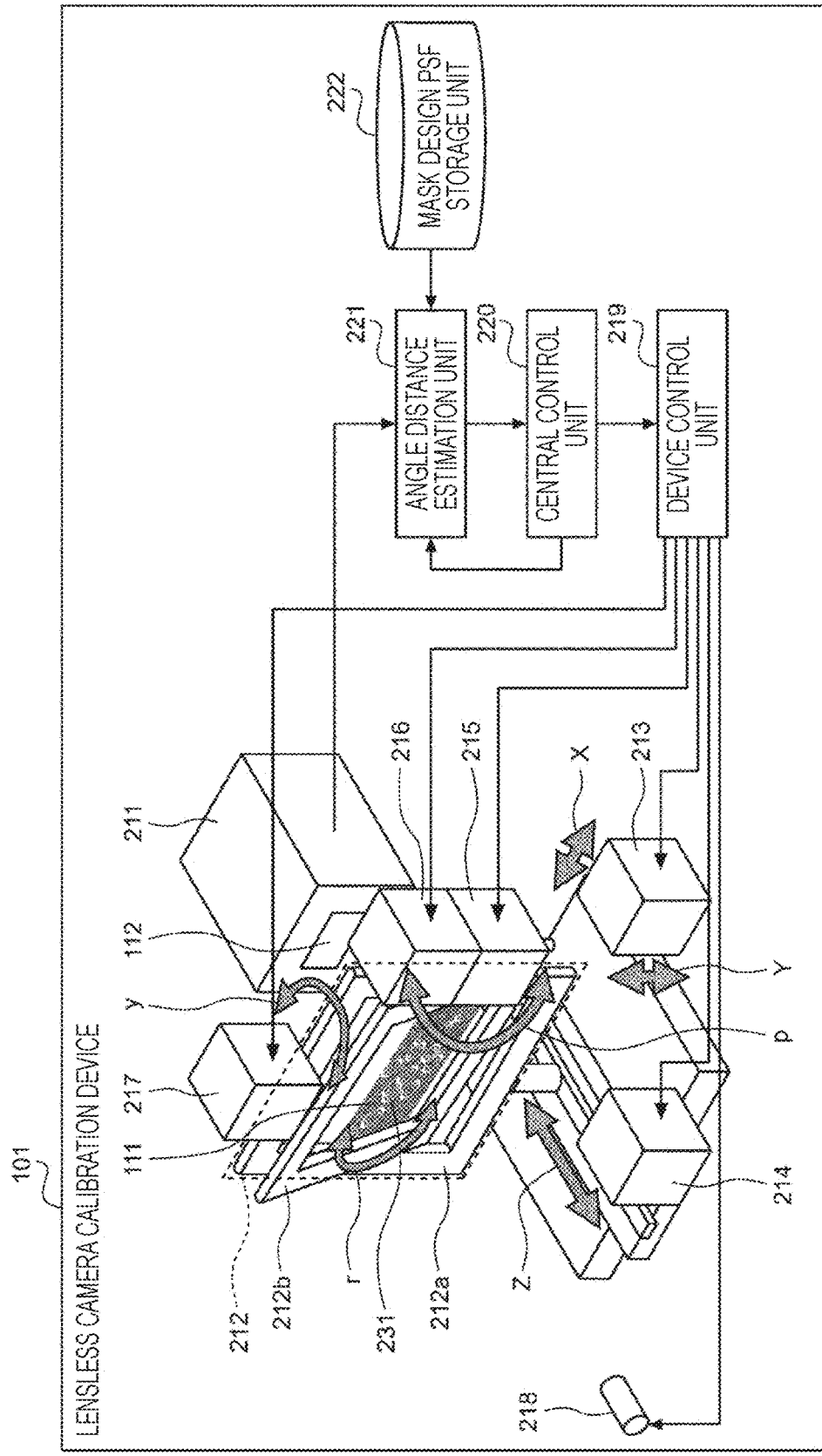
FIG. 12 is a diagram illustrating a configuration example of a lensless camera calibration device of the present disclosure.

The lensless camera calibration device 101 in FIG. 12 includes an imaging element base 211, a mask holding portion 212, an XY-direction adjustment unit 213, a Z-direction adjustment unit 214, a p (pitch)-direction adjustment unit 215, an r (roll)-direction adjustment unit 216, and a y (yaw)-direction adjustment unit 217.

Furthermore, the lensless camera calibration device 101 includes a point light source 218, a device control unit 219, a central control unit 220, an angle distance estimation unit 221, and a mask design PSF storage unit 222.

The imaging element base 211 is a fixed base, and fixes an imaging element 112 with the imaging element 112 facing a mask 111. Furthermore, the imaging element base 211 captures an image captured by the imaging element 112 and outputs the image to the angle distance estimation unit 221.

Note that the mask 111 and the imaging element 112 in FIG. 12 have configurations corresponding to the mask 31 and the imaging element 32 in the imaging device 11 in FIG. 1.

The mask holding portion 212 holds the mask 111, is driven in the directions of arrows X, Y, and Z in the drawing to adjust the position of the mask 111, and is rotated in the roll direction, the pitch direction, and the yaw direction indicated by arrows r, p, and y in the drawing to adjust an angle of the mask 111 relative to the imaging element 112, so as to make the positional relationship between the mask 111 and the imaging element 112 appropriate.

More specifically, the mask holding portion 212 includes an outer frame portion 212*a* and an inner frame portion 212*b*.

The outer frame portion 212*a* rotates, under the control of the y-direction adjustment unit 217, the mask 111 in the yaw direction (hereinafter, also referred to as y direction) indicated by the arrow y in the drawing to adjust the angle of the mask 111, so as to make the mask 111 parallel to the imaging element 112.

Furthermore, the outer frame portion 212*a* is driven in the directions of the arrows X and Y under the control of the XY-direction adjustment unit 213 to adjust the position, so as to make the positional relationship with the imaging element 112 appropriate.

Moreover, the outer frame portion 212*a* is driven in the arrow Z direction under the control of the Z-direction adjustment unit 214 adjust the position, so as to make the distance to the imaging element 112 appropriate.

The inner frame portion 212*b* is provided inside relative to the outer frame portion 212*a*, and is rotated in the pitch direction (hereinafter, also referred to as p direction) indicated by the arrow p by the p-direction adjustment unit 215 and rotated in the roll direction (hereinafter, also referred to as r direction) indicated by the arrow r by the r-direction adjustment unit 216 to adjust the angle of the mask 111 relative to the imaging element 112.

The XY-direction adjustment unit 213, the Z-direction adjustment unit 214, and the y-direction adjustment unit 217 each include a drive device such as a motor, and the XY-direction adjustment unit 213 and the Z-direction adjustment unit 214 adjust the position by driving the outer frame portion 212*a* in the XY directions and the Z direction, respectively, and the y-direction adjustment unit 217 adjusts the angle by rotating the outer frame portion 212*a* in the y direction.

Furthermore, the XY-direction adjustment unit 213, the Z-direction adjustment unit 214, and the y-direction adjustment unit 217 are controlled by the device control unit 219, and the XY-direction adjustment unit 213 and the Z-direction adjustment unit 214 adjusts the position of the mask 111 relative to the imaging element 112 by driving the outer frame portion 212*a* in the XY directions and the Z direction, respectively, and the y-direction adjustment unit 217 adjusts the angle of the mask 111 relative to the imaging element 112 by rotating the outer frame portion 212a in the y direction.

The p-direction adjustment unit 215 and the r-direction adjustment unit 216 each include a drive device such as a motor, and the p-direction adjustment unit 215 and the r-direction adjustment unit 216 rotate the inner frame portion 212b in the p direction and the r direction, respectively.

Furthermore, the p-direction adjustment unit 215 and the r-direction adjustment unit 216 are controlled by the device control unit 219 to adjust the angle of the mask 111 relative to the imaging element 112 by rotating the inner frame portion 212b in the p direction and the r direction, respectively.

The point light source 218 emits white light as incident light to the mask 111 and the imaging element 112. As a result, the incident light from the point light source 218 is condensed by passing through a condenser element 231 (FIG. 13) including the FZP or the like on the mask 111, and impinges on the imaging element 112.

Note that, herein, it is assumed that when the mask 111 and the imaging element 112 have an appropriate positional relationship in which the mask 111 and the imaging element 112 face each other, an image 251 (FIG. 13) of the incident light condensed by the condenser element 231 is captured as a green light on the imaging element 112.

Upon receipt of the image captured by the imaging element 112 and supplied from the imaging element base 211, the angle distance estimation unit 221 estimates a distance correction value that is a Z-direction correction amount and y-direction and p-direction rotation correction values on the basis of the color of light detected as the images 251 (FIG. 13), and supplies the estimated values to the central control unit 220 as distance rotation correction values.

Furthermore, when the Z-direction distance correction and the y-direction and p-direction rotation correction are performed on the basis of the distance rotation correction values, the angle distance estimation unit 221 acquires an image captured by the imaging element 112 again, and generates a captured image peak image representing spreading of the image 251 that is a peak generated by the light condensed by the condenser element 231 from the captured image.

Moreover, the angle distance estimation unit 221 reads a mask design point spread function (PSF) stored in the mask design PSF storage unit 222, and generates a PSF peak image representing spreading of the image 251 that is predicted to occur on the imaging element 112 on the basis of a design arrangement of the condenser element 231 of the mask 111.

Then, the angle distance estimation unit 221 estimates, by comparing the captured image peak image with the PSF peak image, an r-direction rotation correction value for the mask 111 and an XY-direction position correction values for the mask 111 relative to the imaging element 112 such that both the peak positions coincide with each other, and supplies the estimation result to the central control unit 220 as position rotation correction values.

Note that the mask design PSF is a point spread function corresponding to an imaging result when the mask 111 and the imaging element 112 face each other at the appropriate distance. Therefore, the position rotation correction values for correcting the current positional relationship between the mask 111 and the imaging element 112 to the appropriate positional relationship are estimated on the basis of the result of comparison between the PSF peak image based on the mask design PSF and the captured image peak image.

The central control unit 220 includes a processor and a memory, and executes various programs to control the entire operation of the lensless camera calibration device 101. Furthermore, the central control unit 220 determines whether or not the distance between the mask 111 and the imaging element 112 is appropriate and the mask 111 and the imaging element 112 are parallel to each other on the basis of the distance rotation correction values supplied from the angle distance estimation unit 221.

The central control unit 220 controls the device control unit 219 on the basis of the distance rotation correction values supplied from the angle distance estimation unit 221 to repeatedly adjust the distance and angle of the mask 111 relative to the imaging element 112 until the positional relationship between the mask 111 and the imaging element 112 indicates a state where the distance between the mask 111 and the imaging element 112 is appropriate and the mask 111 and the imaging element 112 are parallel to each other.

Then, when the positional relationship between the mask 111 and the imaging element 112 indicates a state where the distance between the mask 111 and the imaging element 112 is appropriate and the mask 111 and the imaging element 112 are parallel to each other, the central control unit 220 adjusts, using the position rotation correction values, the position of the mask 111 by means of translation and rotation such that peak positions that are the positions of the images 251 of both the PSF peak image and the captured image peak image coincide with each other.

The device control unit 219 controls the XY-direction adjustment unit 213, the Z-direction adjustment unit 214, the p-direction adjustment unit 215, the r-direction adjustment unit 216, and the y-direction adjustment unit 217 on the basis of the distance rotation correction values and the position rotation correction values supplied from the central control unit 220 to drive the mask holding portion 212 to adjust the position and angle of the mask 111 relative to the imaging element 112.

<Calibration Method>
<Distance Rotation Correction Processing>

Next, a specific calibration method will be described.

Calibration of the mask 111 relative to the imaging element 112 is achieved by two-step processing of distance rotation correction processing and position rotation correction processing.

Figure 13:
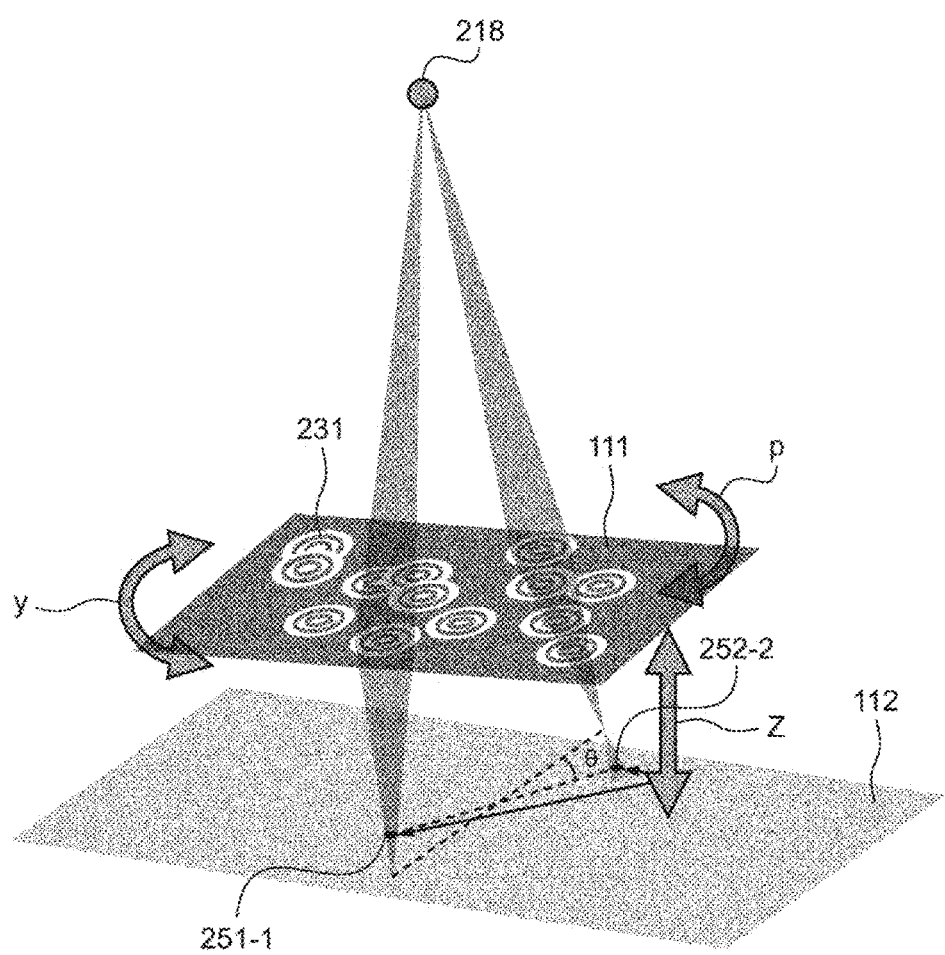
FIG. 13 is a diagram illustrating adjustments in a pitch direction, a yaw direction, and a Z direction between the mask and the imaging element.

As illustrated in FIG. 13, the distance rotation correction processing is processing of correcting the distance between the imaging element 112 and the mask 111 to the appropriate distance and making their respective surfaces of the mask 111 and the imaging element 112 parallel to each other by means of correction by adjustment to the position related to the distance between the mask 111 and the imaging element 112 in the Z direction and correction by rotation in the p direction and the y direction.

That is, as illustrated in FIG. 13, adjusting the rotation in the p direction and the y direction such that images 251-1 and 251-2 captured on the imaging element 112 have the same color to rotate the mask 111 by an angle θ that is a deviation from a state where the mask 111 and the imaging element 112 are parallel to each other makes the mask 111 and the imaging element 112 parallel to each other.

For example, in FIG. 13, in a case where the image 251-1 is captured in red light and the image 251-2 is captured in blue light, the mask 111 is rotated in the p direction so as to move the front side of the mask 111 in the drawing away from the imaging element 112 and conversely move the back side of the mask 111 toward the imaging element 112.

Rotation in the y direction is also made in a similar manner such that all images captured by the imaging element 112 are corrected to have the same color.

Furthermore, all the images captured by the imaging element 112 are moved in the Z direction so as to be captured in green light. For example, in a case where all the images are captured in red light, the position of the mask 111 is corrected so as to move the mask 111 away from the imaging element 112 in the Z direction by a predetermined distance. Conversely, for example, in a case where all the images are captured in blue light, the position of the mask 111 is corrected so as to move the mask 111 toward the imaging element 112 in the Z direction by the predetermined distance.

The correction is performed by means of such distance rotation correction processing so as to make the mask 111 and the imaging element 112 parallel to each other and make the distance between the mask 111 and the imaging element 112 appropriate.

<Position Rotation Correction Processing>

Figure 14:
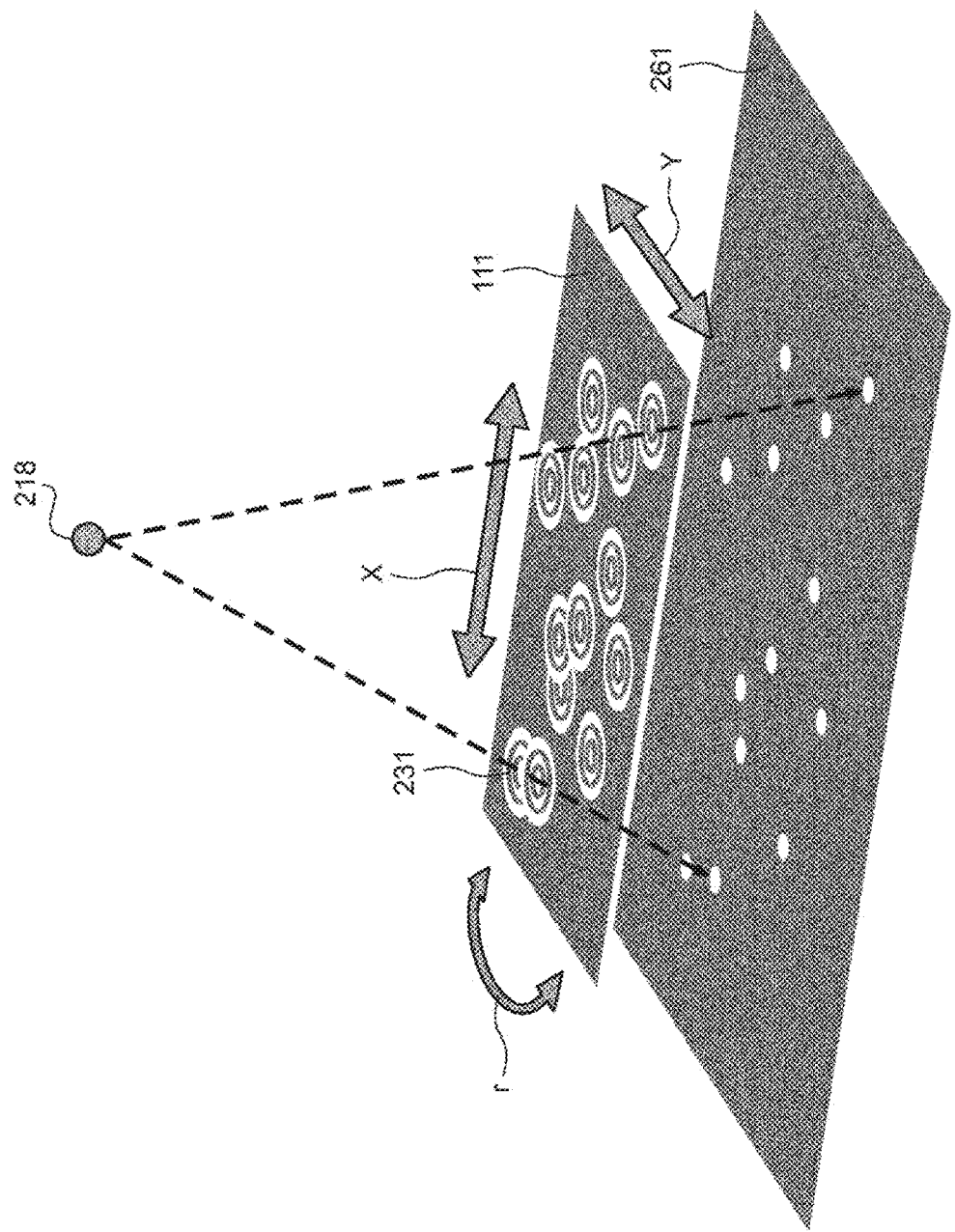
FIG. 14 is a diagram illustrating adjustments in a roll direction and X and Y directions between the mask and the imaging element.

The position rotation correction processing is correction processing performed after the mask 111 and the imaging element 112 are made parallel to each other and the distance between the mask and the imaging element is made appropriate by means of the distance rotation correction processing, and specifically, as illustrated in FIG. 14, the position rotation correction processing is correction processing of moving the mask 111 in the XY direction and rotating the mask 111 in the r direction so as to make a peak position corresponding to an image captured on the imaging element 112 coincident with a peak position corresponding to an image on the mask design PSF.

Note that FIG. 14 illustrates that the incident light from the point light source 218 is condensed, as indicated by a dotted arrow, by passing through the condenser element 231 at a peak position represented by a white circle image on a mask PDF peak image 261, the mask PDF peak image 261 representing peak spreading of the mask design PSF.

That is, the distance rotation correction processing makes the mask 111 parallel to the imaging element 112 and makes the distance between the mask 111 and the imaging element 112 appropriate. Therefore, in the position rotation correction processing, the position is adjusted by means of translation and rotation in a state where the mask 111 is parallel to the imaging element 112 and the distance between the mask 111 and the imaging element 112 is maintained such that a peak position that is an image obtained by incident light condensed by passing through the mask 111 and projected onto the imaging element 112 coincides with a peak position that is an image predicted to be projected onto the imaging element 112 on the basis of the mask design PSF.

As described above, the calibration processing is achieved by the two-step correction processing in which the distance rotation correction processing is performed and then the position rotation correction processing is performed.

<Calibration Processing>

Figure 15:
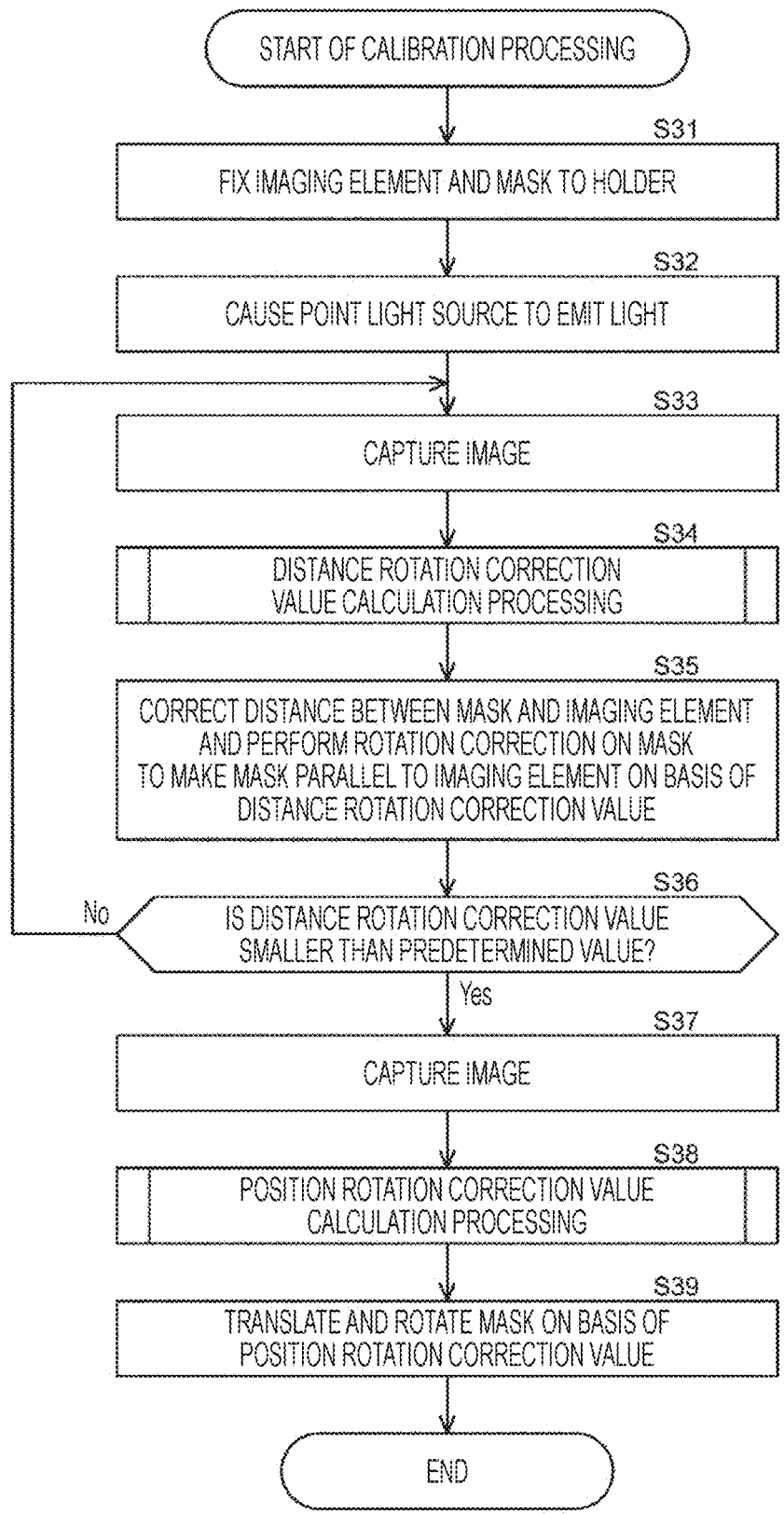
FIG. 15 is a flowchart illustrating calibration processing performed by the lensless camera calibration device in FIG. 12.

Next, calibration processing performed by the lensless camera calibration device 101 in FIG. 12 will be described with reference to the flowchart in FIG. 15.

In step S31, the imaging element 112 is held by the imaging element base 211, and the mask 111 is held by the mask holding portion 212.

In step S32, the central control unit 220 controls the device control unit 219 to cause the point light source 218 to emit light. As a result, white light emitted from the point light source 218 is condensed by passing through the condenser element 231 of the mask 111 according to the wavelength and impinges on the imaging surface of the imaging element 112.

In step S33, the imaging element 112 captures an image and outputs the captured image to the angle distance estimation unit 221. That is, herein, the spreading of the light condensed onto the imaging element 112 by the condenser element 231 of the mask 111 described above according to the wavelength is captured as an image.

In step S34, the central control unit 220 controls the angle distance estimation unit 221 to cause the angle distance estimation unit 221 to perform distance rotation correction value calculation processing on the basis of the image supplied from the imaging element 112 to calculate the Z-direction distance correction value and the p-direction and y-direction rotation correction values for the mask 111 relative to the imaging element 112 as the distance rotation correction values.

Figure 16:
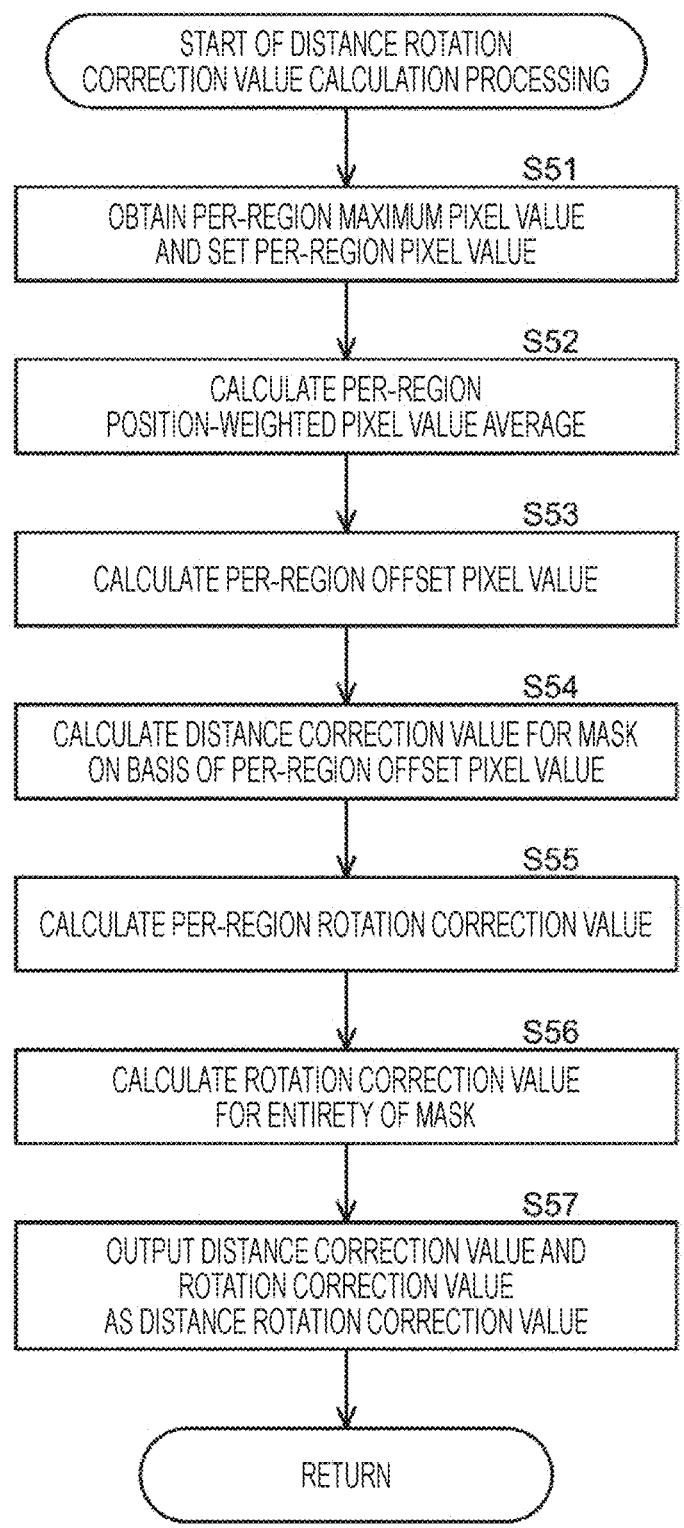
FIG. 16 is a flowchart illustrating distance rotation correction value calculation processing.

Note that the details of the distance rotation correction value calculation processing will be described later with reference to the flowchart in FIG. 16.

In step S35, the central control unit 220 controls the device control unit 219 on the basis of the distance rotation correction values to cause the device control unit 219 to correct the Z-direction distance of the mask 111 and perform rotation correction in the p direction and the y direction on the mask 111, so as to make the mask 111 parallel to the imaging element 112.

That is, the device control unit 219 thereby controls the Z-direction adjustment unit 214 on the basis of the distance correction value of the distance rotation correction values to cause the Z-direction adjustment unit 214 to drive the outer frame portion 212a of the mask holding portion 212 in the Z direction to correct the distance between the mask 111 and the imaging element 112.

Furthermore, the device control unit 219 controls the p-direction adjustment unit 215 and the y-direction adjustment unit 217 on the basis of the rotation correction value of the distance rotation correction values to cause the p-direction adjustment unit 215 to rotate the inner frame portion 212b of the mask holding portion 212 in the p direction and cause the y-direction adjustment unit 217 to rotate the outer frame portion 212a in the y direction, so as to perform correction to make the mask 111 and the imaging element 112 parallel to each other.

That is, the processing in step S35 is the distance rotation correction processing described with reference to FIG. 13.

In step S36, the central control unit 220 determines whether or not each of the distance rotation correction values is smaller than the corresponding predetermined value. That is, the central control unit 220 determines whether or not the Z-direction distance correction value for the mask 111 relative to the imaging element 112 and the p-direction and y-direction rotation correction values, the Z-direction distance correction value and the p-direction and y-direction rotation correction values being the distance rotation correction values, are each smaller than the corresponding predetermined value and the distance rotation correction processing is not required any more.

In step S36, in a case where it is determined that either of the distance rotation correction values is not smaller than the corresponding predetermined value and the distance rotation correction processing is still required, the central control unit 220 returns the processing to step S33.

That is, the processing in steps S33 to S36 is repeated until it is determined that each of the distance rotation correction values is smaller than the corresponding predetermined value and the distance rotation correction processing is not required any more.

Then, in step S36, in a case where it is determined that each of the distance rotation correction values is smaller than the corresponding predetermined value and the distance rotation correction processing is not required any more, the processing proceeds to step S37.

In step S37, the imaging element 112 captures an image and outputs the captured image to the angle distance estimation unit 221. That is, herein, in the distance rotation correction processing, in a state where the mask 111 is parallel to the imaging element 112 and the distance between the mask 111 and the imaging element 112 is appropriate, spreading of an image generated by condensing each component of the incident light according to the wavelength by the condenser element 231 of the mask 111 is captured as an image.

In step S38, the central control unit 220 controls the angle distance estimation unit 221 to cause the angle distance estimation unit 221 to perform the positional rotation correction value calculation processing on the basis of the image supplied from the imaging element 112 to calculate the XY-direction position correction values and the r-direction rotation correction value for the mask 111 relative to the imaging element 112 as the position rotation correction values.

Figure 18:
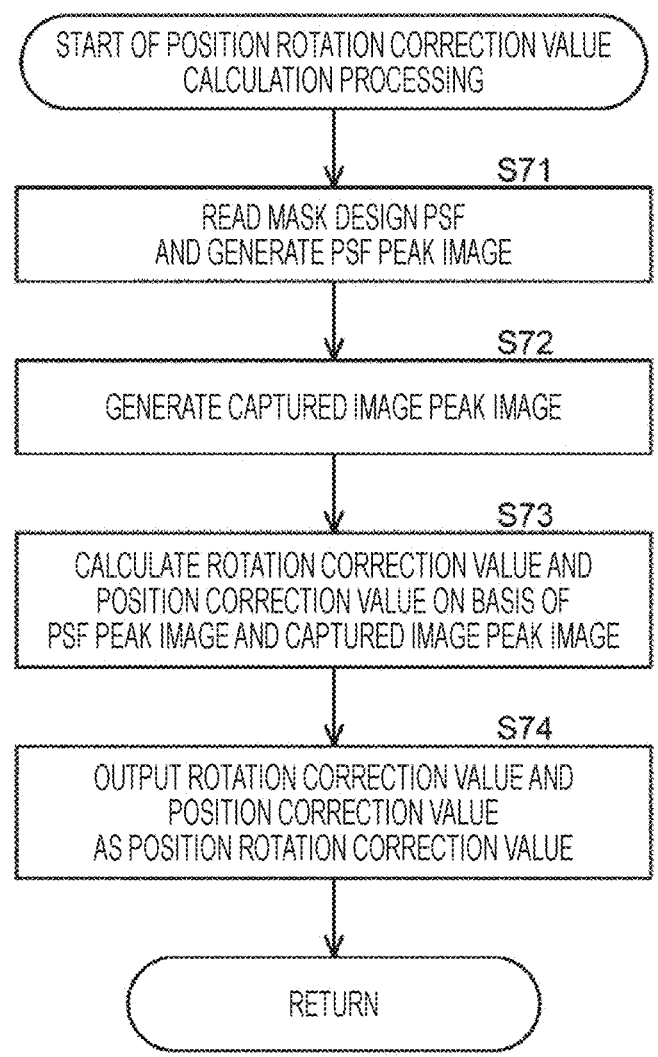
FIG. 18 is a flowchart illustrating position rotation correction value calculation processing.

Note that the details of the position rotation correction value calculation processing will be described later with reference to the flowchart in FIG. 18.

In step S39, the central control unit 220 controls the device control unit 219 on the basis of the position rotation correction values to cause the device control unit 219 to correct the XY-direction position of the mask 111 and perform rotation correction in the r direction on the mask 111, so as to cause the mask 111 to face the imaging element 112, and then brings the processing to an end.

That is, the device control unit 219 thereby controls the XY-direction adjustment unit 213 to drive the outer frame portion 212a of the mask holding portion 212 in the XY direction on the basis of the XY-direction position correction values of the position rotation correction values, so as to correct the position of the mask 111 relative to the imaging element 112.

Furthermore, the device control unit 219 controls the r-direction adjustment unit 216 to rotate the inner frame portion 212b of the mask holding portion 212 in the r direction on the basis of the r-direction rotation correction value of the position rotation correction values, so as to perform correction to cause the mask 111 and the imaging element 112 to face each other in the r direction.

That is, the processing in step S39 is the position rotation correction processing described with reference to FIG. 14.

Through the series of processing described above, the distance rotation correction values are calculated on the basis of the image captured when the light emitted from the point light source 218 is condensed by the condenser element 231 of the mask 111 and impinges on the imaging element 112, and the distance rotation correction processing is performed on the basis of the distance rotation correction values, so that the Z-direction distance between the mask 111 and the imaging element 112 is corrected, and moreover, the rotation correction is performed to make the mask 111 parallel to the imaging element 112 in the p direction and the y direction.

After the distance rotation correction processing is performed, the position rotation correction values are calculated on the basis of the image captured again when light impinges on the imaging element 112, and the position rotation correction processing is performed on the basis of the position rotation correction values, so that the XY-direction position of the mask 111 relative to the imaging element 112 is corrected, and moreover, the rotation correction is performed to make the mask 111 aligned with the imaging element 112 in the r direction.

As a result, the relative positional relationship between the mask 111 and the imaging element 112 is corrected with high accuracy and in a simple manner.

<Distance Rotation Correction Value Calculation Processing>

Next, the distance rotation correction value calculation processing will be described with reference to the flowchart in FIG. 16.

In step S51, the angle distance estimation unit 221 obtains a maximum pixel value for each region where light is condensed by the condenser element 231, and sets a per-region pixel value including a pixel position having the maximum pixel value and the pixel value.

More specifically, for example, in a case where N condenser elements 231 are provided in the mask 111, N images 251 in which light is condensed are generated on the imaging element 112. It is assumed that a region where each of the N images 251 is generated is set as a region pi (i≤N).

Figure 17:
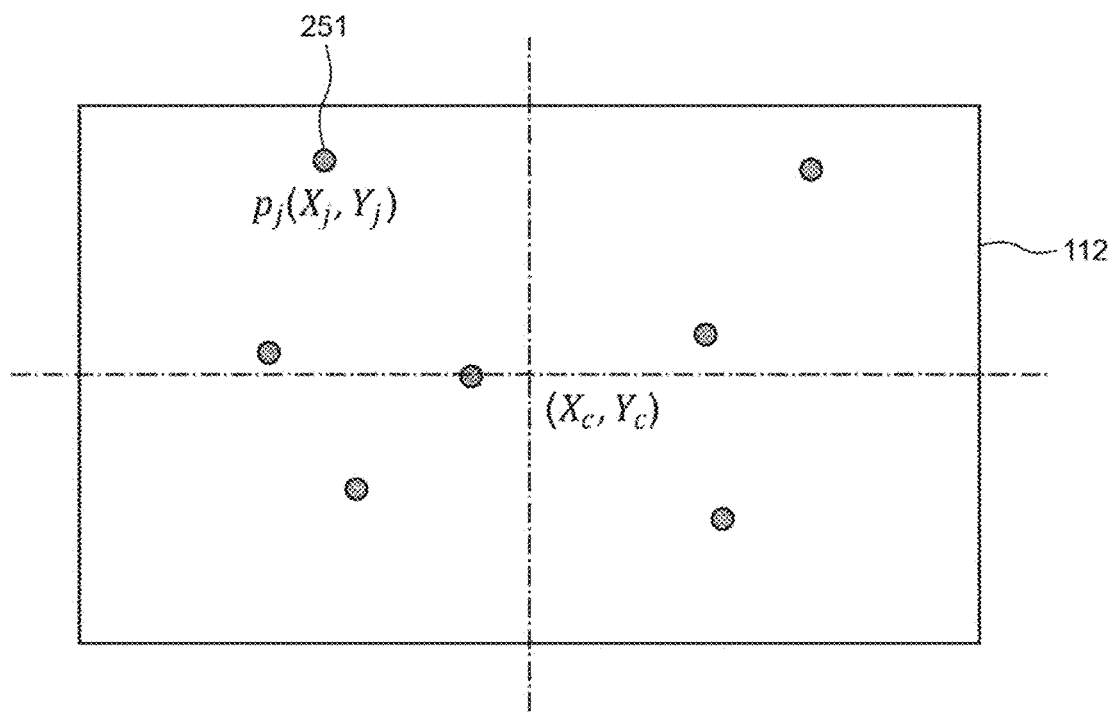
FIG. 17 is a diagram for describing a coordinate system set for each region.

The angle distance estimation unit 221 sets a region pj (Xj, Yj) (j≤N) by using the pixel position having the maximum pixel value in each of the N regions pi as a representative position in each region. Here, as illustrated in FIG. 17, (Xj, Yj) represents coordinates with a center position (Xc, Yc) of the imaging element 112 as an origin.

Furthermore, when the maximum pixel value in the region pj at this time is represented by a per-region pixel value Ij (rj, gj, bj), the angle distance estimation unit 221 sets a per-region position pixel value Ipj (Xj, Yj, rj, gj, bj) as information including the position and the pixel value in each region pj. Note that rj, gj, and bj represent a pixel value of a red (R) component, a pixel value of a green (G) component, and a pixel value of a blue (B) component in each of the pixel value Ij and the per-region position pixel value Ipj.

In step S52, the angle distance estimation unit 221 calculates a position-weighted pixel value average Iave using the following Formula (6) on the basis of the per-region position pixel value Ipj.

$$Iave = (1/2N) \times \Sigma(LSXj \times Ipj) + (1/2N) \times \Sigma(LSYj \times Ipj) \qquad (6)$$

($\Sigma$ represent that $j$ is 0 to $N$)

Here, LSXj and LSYj correspond to (Xj−Xc) and (Yj−Yc), respectively, and represent a weight corresponding to an X-direction distance for each region Pj from the center position (Xc, Yc) of the imaging element 112 and a weight corresponding to a Y-direction distance.

That is, the position-weighted pixel value average Iave is an average value of both of an average of pixel values multiplied by a weight set in accordance with the X-direction position (distance) for each region from the center position (Xc, Yc) of the imaging element 112 and an average of pixel values multiplied by a weight set in accordance with the Y-direction position (distance).

In step S53, the angle distance estimation unit 221 calculates, for each region, a per-region offset pixel value Ijofs (Xj, Yj, rj, gj, bj) by subtracting the position-weighted pixel value average Iave from the per-region position pixel value Ipj (Xj, Yj, rjofs, gjofs, bjofs). Note that rjofs, gjofs, and bjofs represent an offset pixel value of the R component, an offset pixel value of the G component, and an offset pixel value of the B component, respectively.

In step S54, the angle distance estimation unit 221 converts the per-region offset pixel value Ijofs (Xj, Yj, rjofs, gjofs, bjofs) into a per-region distance correction value Djcor that is a distance correction value for each region, and calculates a distance correction value Dcor that is a Z-direction correction value for the mask 111 from an average of the per-region distance correction values Djcor.

Note that the color of the condensed light of the image 251 corresponds to the distance between the mask 111 and the imaging element 112, in a case where the distance is equal to the appropriate distance, the light becomes green light g, in a case where the distance between the mask 111 and the imaging element 112 is shorter than the appropriate distance, the light becomes red light r, and in a case where the distance between the mask 111 and the imaging element 112 is longer than the appropriate distance, the light becomes blue light r.

Such a tendency allows the per-region distance correction value Djcor to be expressed by a predetermined function f (may be either a linear function or a nonlinear function) based on pixel value components (rjofs, gjofs, bjofs) of the per-region offset pixel value Ijofs (Xj, Yj, rjofs, gjofs, bjofs).

Therefore, the angle distance estimation unit 221 converts the per-region offset pixel value Ijofs (Xj, Yj, rjofs, gjofs, bjofs) into the per-region distance correction value Djcor using the function f. Then, the angle distance estimation unit 221 calculates an average of the per-region distance correction values Djcor for the entirety of the imaging element 112 as the distance correction value Dcor that is the Z-direction correction value for the mask 111.

Note that the calculation of converting the per-region offset pixel value Ijofs (Xj, Yj, rjofs, gjofs, bjofs) into the per-region distance correction value Djcor may be performed in advance using the function f, and may be stored as a table for later read out.

In step S55, the angle distance estimation unit 221 calculates a per-region rotation correction value Aj that is a p-direction and y-direction correction value on the basis of the per-region position pixel value Ipj (Xj, Yj, rj, gj, bj).

More specifically, the angle distance estimation unit 221 calculates the per-region rotation correction value Aj using the following Formula (7) on the basis of the per-region position pixel value Ipj (Xj, Yj, rj, gj, bj).

$$Aj = (rj/gj - r0/g0) - (bj/gj - b0/g0) \quad (7)$$

Here, r0, g0, and b0 represent luminance values of red light, green light, and blue light in white light, respectively.

The per-region rotation correction value Aj corresponds a displacement amount for each region by which rotation correction in the p direction and the y direction is performed on the mask 111 to make rj/gj and bj/gj equal to each other and satisfy rj<gj and bj<gj, so as to make the mask 111 and the imaging element 112 parallel to each other.

That is, according to Formula (7), for each region Pj, as the distance between the mask 111 and the imaging element 112 becomes shorter than the appropriate distance, the red light rj becomes larger and the blue light bj becomes smaller, the per-region rotation correction value Aj becomes larger, and when the red light rj becomes stronger than the blue light bj, the sign becomes positive.

Conversely, for each region Pj, as the distance between the mask 111 and the imaging element 112 becomes longer than the appropriate distance, the blue light bj becomes larger and the red light rj becomes smaller, the per-region rotation correction value Aj becomes smaller, and when the blue light bj becomes stronger than the red light rj, the sign becomes negative.

Then, for each region Pj, when the distance between the mask 111 and the imaging element 112 is equal to the appropriate distance, the blue light bj and the red light rj become approximately the same, and the per-region rotation correction value Aj becomes 0.

In step S56, the angle distance estimation unit 221 calculates a y-direction rotation correction value Aycor and a p-direction rotation correction value Apcor for the mask 111 on the basis of the per-region rotation correction value Aj.

More specifically, the angle distance estimation unit 221 calculates the y-direction rotation correction value Aycor and the p-direction rotation correction value Axcor for the mask 111 using the following Formulas (8) and (9), respectively, on the basis of the per-region rotation correction value Aj.

$$Aycor = (1/N) \times \Sigma(LCyj \times Aj) \,(\Sigma \text{ represent that } j \text{ is 0 to } N) \quad (8)$$

$$Apcor = (1/N) \times \Sigma(LCpj \times Aj) \,(\Sigma \text{ represent that } j \text{ is 0 to } N) \quad (9)$$

Here, LCyj and LCpj correspond to (Xj–Xc) and (Yj–Yc), respectively, and represent the X-direction distance for each region Pj from the center position (Xc, Yc) of the imaging element 112 and the Y-direction distance, respectively.

The rotation correction value Aj that is the displacement amount for each region Pj has a relationship of Aj=LCj×tan (θycor) and Aj=LCj×tan (θycor) for each region Pj, where y-direction and p-direction correction angles for the mask 111 are represented by correction angles θycol and θpcol, respectively.

That is, the rotation correction values Aycor and Apcor for the entirety of the mask 111 are weighted averages obtained by assigning a weight including the distances LCyj and LCpj from the center to the rotation correction value Aj that is the displacement amount for each region Pj with the correction angles θycor and θpcor for the mask 111 controlled by means of rotation in the y direction and the p direction, respectively, on the assumption that the correction amount for the center position of the mask 111 is 0.

In step S57, the angle distance estimation unit 221 outputs, as described above as the distance rotation correction values, the distance correction value Dcor that is the Z-direction correction value for the mask 111, and the rotation correction values Aycor and Apcor including the y-direction correction angle θycor and the p-direction correction angle θpcor for the mask 111 calculated to the central control unit 220.

Through the above-described processing, the distance correction value Dcor that is the Z-direction correction value for the mask 111, and the rotation correction values Aycor and Apcor that are the y-direction correction angle θycol and the p-direction correction angle for the mask 111 are calculated.

Accordingly, the central control unit 220 controls the device control unit 219 using the distance correction value Dcor that is the Z-direction correction value to cause the Z-direction adjustment unit 214 to adjust the Z-direction distance of the mask 111 fixed to the outer frame portion 212a, so as to correct the distance between the mask 111 and the imaging element 112 to the appropriate distance.

Furthermore, the central control unit 220 controls the device control unit 219 using the rotation correction values Apcor and Aycor to cause the p-direction adjustment unit 215 to adjust the p-direction rotation of the mask 111 fixed to the inner frame portion 212b and cause the y-direction adjustment unit 217 to adjust the y-direction rotation of the mask 111 fixed to the outer frame portion 212a, so as to perform correction to make the mask 111 and the imaging element 112 parallel to each other.

<Position Rotation Correction Value Calculation Processing>

Next, the position rotation correction value calculation processing will be described with reference to the flowchart in FIG. 18.

In step S71, the angle distance estimation unit 221 reads the mask design PSF from the mask design PSF storage unit 222, reads a peak position corresponding to a position of an image predicted to occur by condensation of light when the condenser element 231 of the mask 111 is arranged as designed, and generates a PSF peak image.

In step S72, the angle distance estimation unit 221 extracts, from the image captured by the imaging element 112, a peak position including a position of an image generated by light condensed by the condenser element 231, and generates a captured image peak image including the peak position.

In step S73, the angle distance estimation unit 221 calculates, on the basis of the PSF peak image and the captured image peak image, an r-direction rotation correction value Rcor and position correction values Xcor and Ycor for the mask 111 using an algorithm such as scale-invariant feature transform (SIFT) (see https://patents.google.com/patent/ U.S. Pat. No. 6,711,293)), so as to make their respective peak positions coincident with each other.

In step S74, the angle distance estimation unit 221 outputs the r-direction rotation correction value Rcor and the position correction values Xcor and Ycor to the central control unit 220 as the position rotation correction values.

Through the above-described processing, the rotation correction value Rcor that is an r-direction correction value for the mask 111, and the position correction values Xcor and Ycor that are an X-direction correction value and a Y-direction correction value for the mask 111 are calculated.

Accordingly, the central control unit 220 controls the device control unit 219 on the basis of the r-direction rotation correction value Rcor to cause the r-direction adjustment unit 216 to adjust the r-direction rotation of the mask 111 fixed to the inner frame portion 212b.

Furthermore, the central control unit 220 controls the device control unit 219 on the basis of the position correction values Xcor and Ycor to cause the XY-direction adjustment unit 213 to adjust the X-direction position and the Y-direction position of the mask 111 fixed to the outer frame portion 212a.

Through the series of processing described above, it is possible to perform the adjustment (calibration) with high accuracy and in a simple manner so as to bring the distance and the angle between the mask 111 and the imaging element 112 into an appropriate state, that is, to cause the mask 111 and the imaging element 112 to face each other with an appropriate positional relationship.

<<4. Example of Execution by Software>>

Incidentally, the series of processing described above can be performed by hardware, but can also be performed by software. In a case where the series of processing is performed by software, a program constituting the software is installed from a recording medium into, for example, a computer built into dedicated hardware or a general-purpose computer that is capable of executing various functions by installing various programs, or the like.

Figure 19:
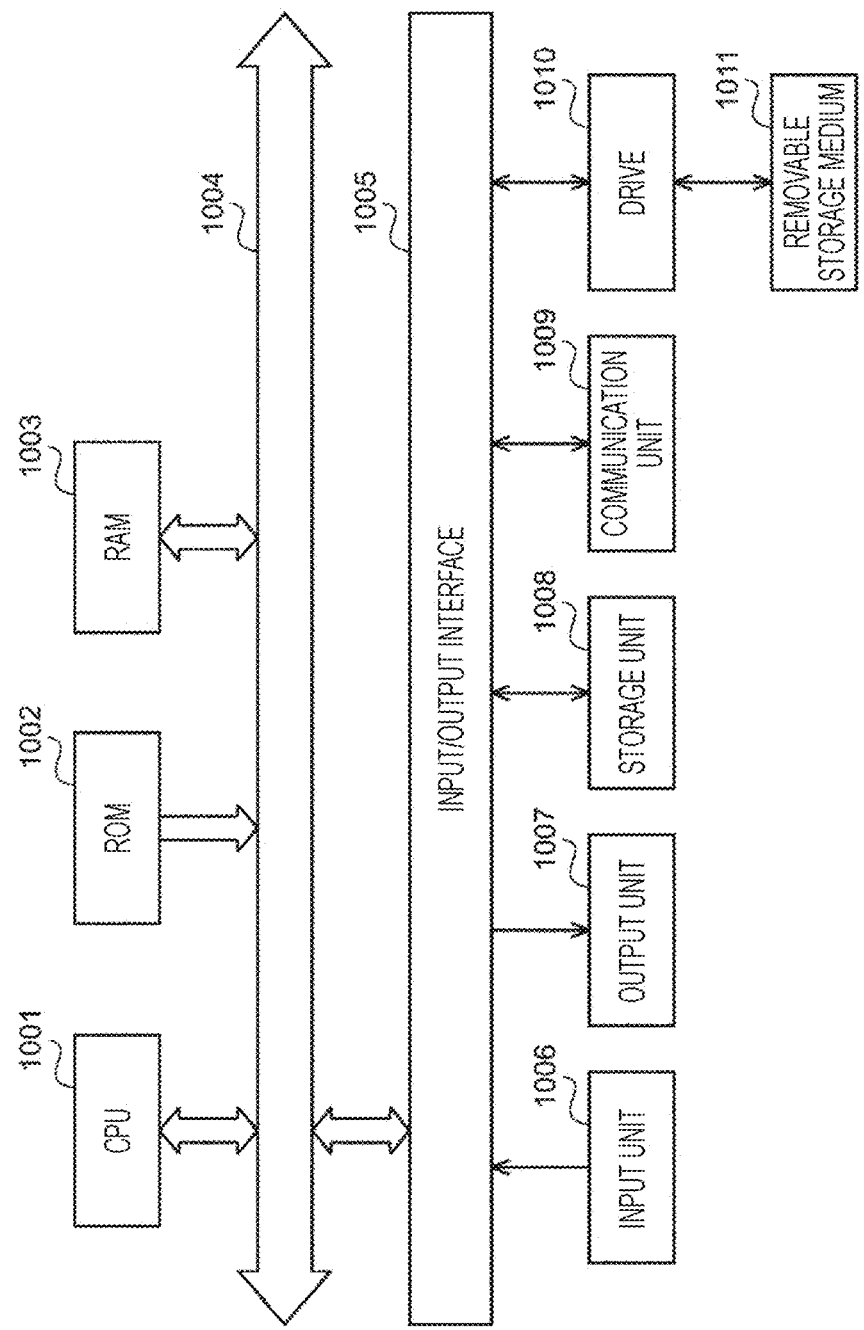
FIG. 19 illustrates a configuration example of a general-purpose computer.

FIG. 19 illustrates a configuration example of a general-purpose computer. This computer includes a central processing unit (CPU) 1001. An input/output interface 1005 is connected to the CPU 1001 via a bus 1004. A read only memory (ROM) 1002 and a random access memory (RAM) 1003 are connected to the bus 1004.

To the input/output interface 1005, an input unit 1006 including an input device such as a keyboard and a mouse by which a user inputs operation commands, an output unit 1007 that outputs a processing operation screen and an image of a processing result to a display device, a storage unit 1008 that includes a hard disk drive and the like and stores programs and various data, and a communication unit 1009 including a local area network (LAN) adapter or the like and performs communication processing via a network represented by the Internet are connected. Furthermore, a drive 1010 that reads and writes data from and to a removable storage medium 1011 such as a magnetic disk (including flexible disk), an optical disc (including compact disc-read only memory (CD-ROM) and digital versatile disc (DVD)), a magneto-optical disk (including Mini Disc (MD)), or a semiconductor memory is connected.

The CPU 1001 performs various processing in accordance with a program stored in the ROM 1002, or a program read from the removable storage medium 1011 such as a magnetic disk, an optical disc, a magneto-optical disk, or a semiconductor memory, installed in the storage unit 1008, and loaded from the storage unit 1008 into the RAM 1003. Furthermore, the RAM 1003 also appropriately stores data necessary for the CPU 1001 to performs various processing, and the like.

In the computer configured as described above, for example, the CPU 1001 loads the program stored in the storage unit 1008 into the RAM 1003 via the input/output interface 1005 and the bus 1004 and executes the program to perform the above-described series of processing.

The program executed by the computer (CPU 1001) can be provided by being recorded in the removable storage medium 1011 as a package medium or the like, for example. Furthermore, the program can be provided via a wired or wireless transmission medium such as a local area network, the Internet, or digital satellite broadcasting.

In the computer, the program can be installed in the storage unit 1008 via the input/output interface 1005 with the removable storage medium 1011 attached to the drive 1010. Furthermore, the program can be received by the communication unit 1009 via a wired or wireless transmission medium and installed in the storage unit 1008. Alternatively, the program can be preinstalled in the ROM 1002 and the storage unit 1008.

Note that, the program to be executed by the computer may be a program that performs processing in time series in the order described in the present specification, or may be a program that performs processing in parallel or at a required timing such as when a call is made.

Note that the CPU 1001 in FIG. 19 implements at least one of the functions of the device control unit 219, the central control unit 220, and the angle distance estimation unit 221 in FIG. 12.

Furthermore, in the present specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

Note that embodiments of the present disclosure are not limited to the embodiment described above, and various modifications may be made without departing from the scope of the present disclosure.

For example, the present disclosure may have a configuration of cloud computing in which one function is shared by a plurality of devices via a network and processing is performed in cooperation.

Furthermore, each step described in the flowcharts described above may be executed by one device or by a plurality of devices in a shared manner.

Moreover, in a case where a plurality of processes is included in one step, the plurality of processes included in the one step may be performed by one device or performed by a plurality of devices in a shared manner.

Furthermore, the present disclosure may also have the following configurations.

<1> An adjustment device including:
a mask holding portion configured to hold a mask of an imaging device and adjust a position and an angle of the mask relative to an imaging element, the mask including a transmissive region including a plurality of condenser elements and a plurality of light-shielding regions and being configured to modulate incident light into modulated light by causing the incident light to pass through the mask, the imaging element being configured to capture a modulated image including the modulated light passing through the mask, the imaging device including the mask, the imaging element, and a reconstruction unit configured to reconstruct an image corresponding to the incident light on the basis of the modulated image;
a point light source configured to emit white light as the incident light; and
a control unit configured to control the mask holding portion to adjust the mask to establish a predetermined positional relationship between the mask and the imaging element on the basis of a color of light corresponding to a wavelength of an image captured by the imaging element when the white light passes through the mask as the incident light.

<2> The adjustment device according to <1>, in which
the control unit controls the mask holding portion to adjust the position and the angle of the mask relative to the imaging element to establish the predetermined positional relationship.

<3> The adjustment device according to <2>, in which
the control unit controls the mask holding portion to adjust a distance between the mask and the imaging element to a distance corresponding to the predetermined positional relationship and adjust the angle of the mask to make the mask parallel to the imaging element.

<4> The adjustment device according to <3>, in which
the control unit controls the mask holding portion to adjust the distance between the mask and the imaging element to a distance at which the image is captured by the imaging element as light of a predetermined color and adjust a yaw-direction and pitch-direction angle of the mask to an angle at which the mask is parallel to the imaging element.

<5> The adjustment device according to claim <4>, in which
the light of the predetermined color is green light.

<6> The adjustment device according to <3>, further including
a correction value calculation unit configured to calculate a distance correction value used to adjust the distance between the mask and the imaging element to a predetermined distance that is a distance corresponding to a predetermined position and a rotation correction value used to adjust the angle of the mask to make the mask parallel to the imaging element.

<7> The adjustment device according to <6>, in which
the correction value calculation unit calculates, for each image captured by the imaging element, a difference from an average pixel value of the image captured by the imaging element as an offset pixel value for each image, converts the offset pixel value for each image into a distance correction value for each image, and calculates an average of the distance correction value for each image as the distance correction value.

<8> The adjustment device according to <7>, in which
the average pixel value of the image is a weighted average obtained by assigning a weight corresponding to a distance between a position of the image and a center position of the imaging element to a pixel value of each image, the weight having a sign that changes to positive or negative with respect to the center position of the imaging element.

<9> The adjustment device according to <6>, in which
the correction value calculation unit calculates, for each image captured by the imaging element, both a difference between a ratio of an R component to a G component of a pixel value of the image captured by the imaging element and a ratio of an R component to a G component of the white light and a difference between a ratio of a B component to the G component of the pixel value of the image and a ratio of a B component to the G component of the white light as a rotation correction value for each image, and calculates a weighted average of the rotation correction value for each image as the rotation correction value for an entirety of the mask, the weighted average being set in accordance with a distance between the image and a center position of the imaging element.

<10> The adjustment device according to any one of <3> to <9>, in which
after adjusting the distance between the mask and the imaging element to the distance corresponding to the predetermined position and adjusting the angle of the mask to make the mask parallel to the imaging element, the control unit controls the mask holding portion to adjust the mask to a position and an angle at which the mask faces the imaging element.

<11> The adjustment device according to <10>, in which
the control unit controls the mask holding portion to adjust the mask to a position and an angle at which spreading of an image in an image captured by the imaging element coincides with spreading of an image based on a mask design point spread function (PSF), and the mask faces the imaging element.

<12> The adjustment device according to <11>, in which
the control unit controls the mask holding portion to adjust the position of the mask by means of translation and adjust a roll-direction angle of the mask to make the spreading of the image in the image captured by the imaging element and the spreading of the image based on the mask design PSF coincident with each other.

<13> The adjustment device according to <12>, further including
a correction value calculation unit configured to calculate a position correction value and a rotation correction value, the position correction value being used to adjust the position of the mask by means of translation and the rotation correction value being used to adjust the roll-direction angle of the mask to make the spreading of the image in the image captured by the imaging element and the spreading of the image based on the mask design PSF coincident with each other, in which
the control unit controls the mask holding portion to adjust the position of the mask by means of translation on the basis of the position correction value and adjust the roll-direction angle of the mask on the basis of the rotation correction value to make the spreading of the image in the image captured by the imaging element and the spreading of the image based on the mask design PSF coincident with each other.

<14> An operation method of an adjustment device, the adjustment device including: a mask holding portion configured to hold a mask of an imaging device and adjust a position and an angle of the mask relative to an imaging element, the mask including a transmissive region including a plurality of fresnel zone plates (FZPs) and a plurality of light-shielding regions and being configured to modulate incident light into modulated light by causing the incident light to pass through the mask, the imaging element being configured to capture a modulated image including the modulated light passing through the mask, the imaging device including the mask, the imaging element, and a reconstruction unit configured to reconstruct an image corresponding to the incident light on the basis of the modulated image; and a point light source configured to emit white light as the incident light,
the operation method including controlling the mask holding portion to adjust the mask to establish a predetermined positional relationship between the mask and the imaging element on the basis of a color of light corresponding to a wavelength of an image captured by the imaging element when the white light passes through the mask as the incident light.

REFERENCE SIGNS LIST

101 Lensless camera calibration device
211 Imaging element base
212 Mask holding portion
212a Outer frame portion
212b Inner frame portion
213 XY-direction adjustment unit
214 Z-direction adjustment unit
215 p-direction adjustment unit
216 r-direction adjustment unit
217 y-direction adjustment unit
218 Point light source
219 Device control unit
220 Central control unit
221 Angle distance estimation unit
222 Mask design PSF storage unit
231 Condenser element
251 Image

The invention claimed is:

1. An adjustment device comprising:
a mask holding portion configured to hold a mask of an imaging device and adjust a position and an angle of the mask relative to an imaging element, the mask including a transmissive region including a plurality of Fresnel zone plates (FZPs) and a plurality of light-shielding regions and being configured to modulate incident light into modulated light by causing the incident light to pass through the mask, the imaging element being configured to capture a modulated image including the modulated light passing through the mask, the imaging device including the mask, the imaging element, and a reconstruction unit configured to reconstruct an image corresponding to the incident light on a basis of the modulated image;
a point light source configured to emit white light as the incident light; and
a control unit configured to control the mask holding portion to adjust the mask to establish a predetermined positional relationship between the mask and the imaging element on a basis of a color of light corresponding to a wavelength of an image captured by the imaging element when the white light passes through the mask as the incident light.

2. The adjustment device according to claim 1, wherein the control unit controls the mask holding portion to adjust the position and the angle of the mask relative to the imaging element to establish the predetermined positional relationship.

3. The adjustment device according to claim 2, wherein the control unit controls the mask holding portion to adjust a distance between the mask and the imaging element to a distance corresponding to the predetermined positional relationship and adjust the angle of the mask to make the mask parallel to the imaging element.

4. The adjustment device according to claim 3, wherein the control unit controls the mask holding portion to adjust the distance between the mask and the imaging element to a distance at which the image is captured by the imaging element as light of a predetermined color and adjust a yaw-direction and pitch-direction angle of the mask to an angle at which the mask is parallel to the imaging element.

5. The adjustment device according to claim 4, wherein the light of the predetermined color is green light.

6. The adjustment device according to claim 3, further comprising
a correction value calculation unit configured to calculate a distance correction value used to adjust the distance between the mask and the imaging element to a predetermined distance that is a distance corresponding to a predetermined position and a rotation correction value used to adjust the angle of the mask to make the mask parallel to the imaging element.

7. The adjustment device according to claim 6, wherein the correction value calculation unit calculates, for each image captured by the imaging element, a difference from an average pixel value of the image captured by the imaging element as an offset pixel value for each image, converts the offset pixel value for each image into a distance correction value for each image, and calculates an average of the distance correction value for each image as the distance correction value.

8. The adjustment device according to claim 7, wherein the average pixel value of the image is a weighted average obtained by assigning a weight corresponding to a distance between a position of the image and a center position of the imaging element to a pixel value of each image, the weight having a sign that changes to positive or negative with respect to the center position of the imaging element.

9. The adjustment device according to claim 6, wherein the correction value calculation unit calculates, for each image captured by the imaging element, both a difference between a ratio of an R component to a G component of a pixel value of the image captured by the imaging element and a ratio of an R component to a G component of the white light and a difference between a ratio of a B component to the G component of the pixel value of the image and a ratio of a B component to the G component of the white light as a rotation correction value for each image, and calculates a weighted average of the rotation correction value for each image as the rotation correction value for an entirety of the mask, the weighted average being set in accordance with a distance between the image and a center position of the imaging element.

10. The adjustment device according to claim 3, wherein after adjusting the distance between the mask and the imaging element to the distance corresponding to the predetermined position and adjusting the angle of the mask to make the mask parallel to the imaging element, the control unit controls the mask holding portion to adjust the mask to a position and an angle at which the mask faces the imaging element.

11. The adjustment device according to claim 10, wherein the control unit controls the mask holding portion to adjust the mask to a position and an angle at which spreading of an image in an image captured by the imaging element coincides with spreading of an image based on a mask design point spread function (PSF), and the mask faces the imaging element.

12. The adjustment device according to claim 11, wherein the control unit controls the mask holding portion to adjust the position of the mask by means of translation and adjust a roll-direction angle of the mask to make the spreading of the image in the image captured by the imaging element and the spreading of the image based on the mask design PSF coincident with each other.

13. The adjustment device according to claim 12, further comprising
a correction value calculation unit configured to calculate a position correction value and a rotation correction value, the position correction value being used to adjust the position of the mask by means of translation and the rotation correction value being used to adjust the roll-direction angle of the mask to make the spreading of the image in the image captured by the imaging element and the spreading of the image based on the mask design PSF coincident with each other, wherein
the control unit controls the mask holding portion to adjust the position of the mask by means of translation on a basis of the position correction value and adjust the roll-direction angle of the mask on a basis of the rotation correction value to make the spreading of the image in the image captured by the imaging element and the spreading of the image based on the mask design PSF coincident with each other.

14. An operation method of an adjustment device, the adjustment device including: a mask holding portion configured to hold a mask of an imaging device and adjust a position and an angle of the mask relative to an imaging element, the mask including a transmissive region including a plurality of fresnel zone plates (FZPs) and a plurality of light-shielding regions and being configured to modulate incident light into modulated light by causing the incident light to pass through the mask, the imaging element being configured to capture a modulated image including the modulated light passing through the mask, the imaging device including the mask, the imaging element, and a reconstruction unit configured to reconstruct an image corresponding to the incident light on a basis of the modulated image; and a point light source configured to emit white light as the incident light,
the operation method comprising controlling the mask holding portion to adjust the mask to establish a predetermined positional relationship between the mask and the imaging element on a basis of a color of light corresponding to a wavelength of an image captured by the imaging element when the white light passes through the mask as the incident light.

\* \* \* \* \*